US012494176B2

(12) United States Patent

Zhang et al.

(10) Patent No.: US 12,494,176 B2

(45) Date of Patent: Dec. 9, 2025

(54) DISPLAY PANEL AND DISPLAY DEVICE

(71) Applicant: Wuhan Tianma Microelectronics Co., Ltd., Wuhan (CN)

(72) Inventors: Dian Zhang, Wuhan (CN); Wenshuai Zhang, Wuhan (CN)

(73) Assignee: Wuhan Tianma Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 18/752,535

(22) Filed: Jun. 24, 2024

(65) Prior Publication Data

US 2024/0347010 A1 Oct. 17, 2024

(30) Foreign Application Priority Data

Jun. 26, 2023 (CN) ......................... 202310766255.8

(51) Int. Cl.

*G09G 3/3266* (2016.01)
*G09G 3/3225* (2016.01)

(52) U.S. Cl.

CPC ......... *G09G 3/3266* (2013.01); *G09G 3/3225* (2013.01); *G09G 2300/0426* (2013.01); *G09G 2300/0842* (2013.01); *G09G 2300/0861* (2013.01); *G09G 2310/0286* (2013.01); *G09G 2310/08* (2013.01); *G09G 2320/0233* (2013.01)

(58) Field of Classification Search

None

See application file for complete search history.

(56) References Cited

U.S. PATENT DOCUMENTS

| | | | | |
|---|---|---|---|---|
| 2021/0027704 A1* | 1/2021 | Tong | G09G 3/3225 | |
| 2023/0140104 A1* | 5/2023 | Zhang | G09G 3/3266 | 345/204 |
| 2023/0141543 A1* | 5/2023 | Gu | G11C 19/28 | 345/206 |

FOREIGN PATENT DOCUMENTS

| | | |
|---|---|---|
| CN | 108376522 A | 8/2018 |
| CN | 108630735 B | 1/2021 |

* cited by examiner

*Primary Examiner* — Christopher J Kohlman

(74) *Attorney, Agent, or Firm* — KDW FIRM PLLC

(57) ABSTRACT

A display panel includes a display region, a shift register region, and a compensation region. The display region includes multiple display pixel groups. A display pixel group includes multiple first pixel units arranged in sequence along a first direction. The shift register region includes first shift register units and second shift register units. A first shift register unit is electrically connected to m display pixel groups, and a second shift register unit is electrically connected to n display pixel groups, where m and n are positive integers, and m>n. The compensation region includes load compensation units electrically connected to the second shift register units.

20 Claims, 18 Drawing Sheets

DISPLAY PANEL AND DISPLAY DEVICE

CROSS-REFERENCE TO RELATED APPLICATION

This application claims priority to Chinese Patent Application No. 202310766255.8 filed Jun. 26, 2023, the disclosure of which is incorporated herein by reference in its entirety.

TECHNICAL FIELD

Embodiments of the present disclosure relate to the field of display technologies and, for example, to a display panel and a display device.

BACKGROUND

With the development of display technologies, a display device with a high screen-to-body ratio and a narrow bezel becomes more and more popular due to good user experience.

In a display panel, a gate driving circuit is needed to scan a gate line, and multiple shift registers are provided in the gate driving circuit to provide scan signals. However, to achieve the narrow bezel design, in the current display panel, the same shift register is used to drive multiple pixel rows to reduce the number of shift registers. However, with the above configuration, the rows of pixels at the bottom of the display panel have an obvious over-brightness problem, affecting display uniformity.

SUMMARY

The present disclosure provides a display panel and a display device to perform load compensation on some shift registers, balance the brightness of pixel rows, and improve the display uniformity of the display panel.

In a first aspect, an embodiment of the present disclosure provides a display panel. The display panel includes a display region and a bezel region surrounding the display region, where the bezel region includes a shift register region and a compensation region, and the shift register region is located on at least one side of the display region in a first direction.

The display region includes multiple display pixel groups, a display pixel group of the multiple display pixel groups includes multiple first pixel units arranged in sequence along the first direction, and the multiple display pixel groups are arranged in sequence along a second direction, where the first direction intersects with the second direction.

The shift register region includes first shift register units and second shift register units, where a first shift register unit of the first shift register units is electrically connected to m display pixel groups of the multiple display pixel groups, and a second shift register unit of the second shift register units is electrically connected to n display pixel groups of the multiple display pixel groups, where m and n are positive integers, and $m>n$.

The compensation region includes load compensation units electrically connected to the second shift register units.

In a second aspect, an embodiment of the present disclosure further provides a display device. The display device includes a display panel, where the display panel includes a display region and a bezel region surrounding the display region, where the bezel region includes a shift register region and a compensation region, and the shift register region is located on at least one side of the display region in a first direction.

The display region includes multiple display pixel groups, a display pixel group of the multiple display pixel groups includes multiple first pixel units arranged in sequence along the first direction, and the multiple display pixel groups are arranged in sequence along a second direction, where the first direction intersects with the second direction.

The shift register region includes first shift register units and second shift register units, where a first shift register unit of the first shift register units is electrically connected to m display pixel groups of the multiple display pixel groups, and a second shift register unit of the second shift register units is electrically connected to n display pixel groups of the multiple display pixel groups, where m and n are positive integers, and $m>n$.

The compensation region includes load compensation units electrically connected to the second shift register units.

DETAILED DESCRIPTION

Figure 1:
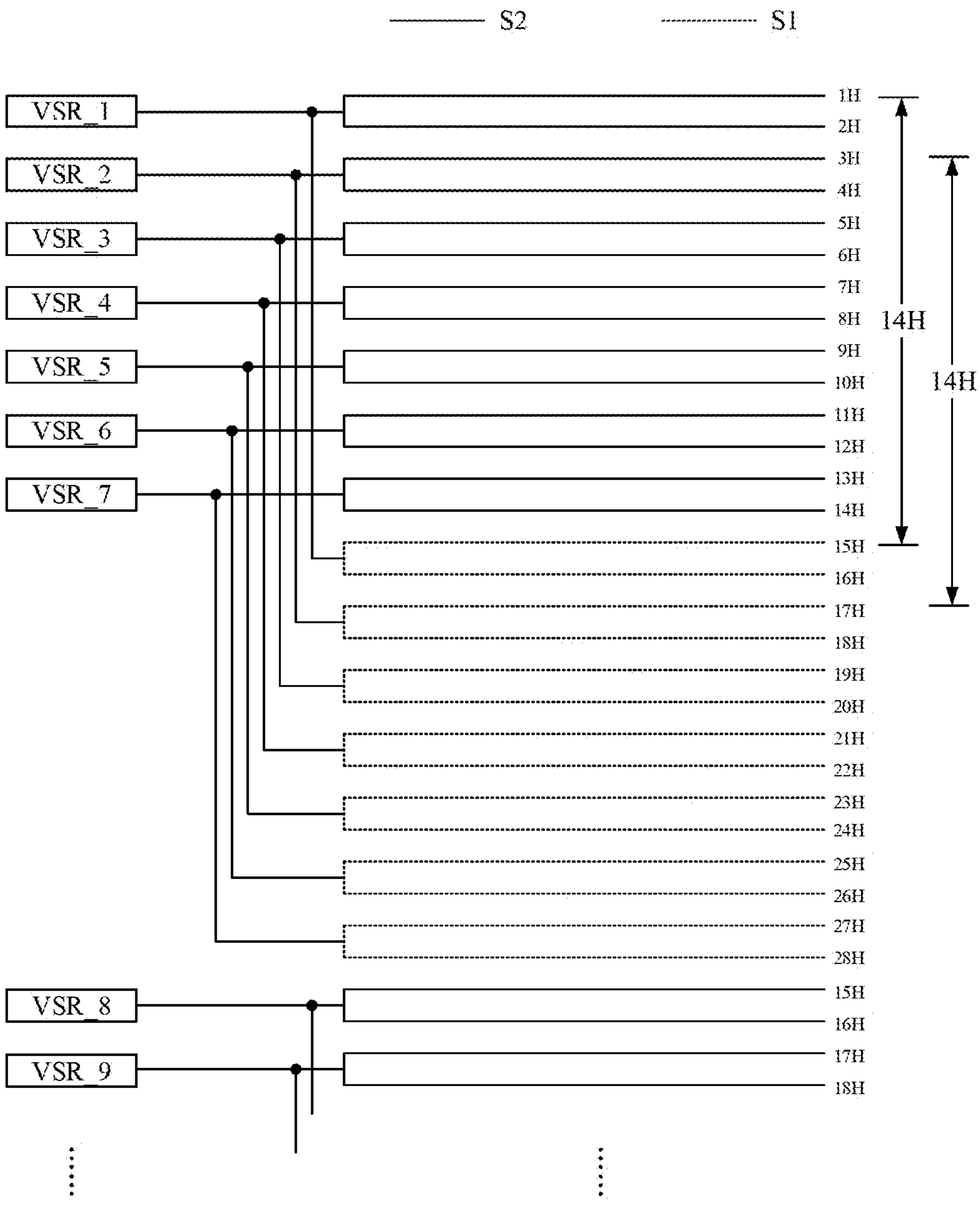
FIGS. 1 and 2 are schematic diagrams of gate driving relationships in different regions of a display panel.

Hereinafter the present disclosure is further described in detail in conjunction with the drawings and embodiments. It is to be understood that the embodiments described herein are intended to illustrate and not to limit the present disclosure. Additionally, it is to be noted that for ease of description, only part, not all, of structures related to the present disclosure are illustrated in the drawings.

Terms used in the embodiments of the present disclosure are intended only to describe the specific embodiments and not to limit the present disclosure. It is to be noted that nouns of locality, including "up", "down", "left", and "right" used in the embodiments of the present disclosure, are described from the perspective of the drawings and are not to be construed as a limitation to the embodiments of the present disclosure. In addition, in the context, it is to be understood that when a component is formed "on" or "below" another component, the component may not only be directly formed "on" or "below" another component but may also be indirectly formed "on" or "below" another component via an intermediate component. Terms such as "first" and "second" are used only for the purpose of description to distinguish between different components and not to indicate any order, quantity, or importance. For those of ordinary skill in the art, specific meanings of the preceding terms in the present disclosure may be understood based on specific situations.

The terms "comprise", "include", and variations thereof in the present disclosure are intended to be inclusive, that is, "including, but not limited to". The term "based on" is "at least partially based on". The term "an embodiment" refers to "at least one embodiment".

It is to be noted that references to "first", "second", and the like in the present disclosure are merely intended to distinguish corresponding content and are not intended to limit an order or an interrelationship.

It is to be noted that "one" and "a plurality" mentioned in the present disclosure are illustrative and not limiting, and that those skilled in the art should understand that "one" and "a plurality" should be understood as "one or more" unless clearly indicated in the context.

Figure 2:
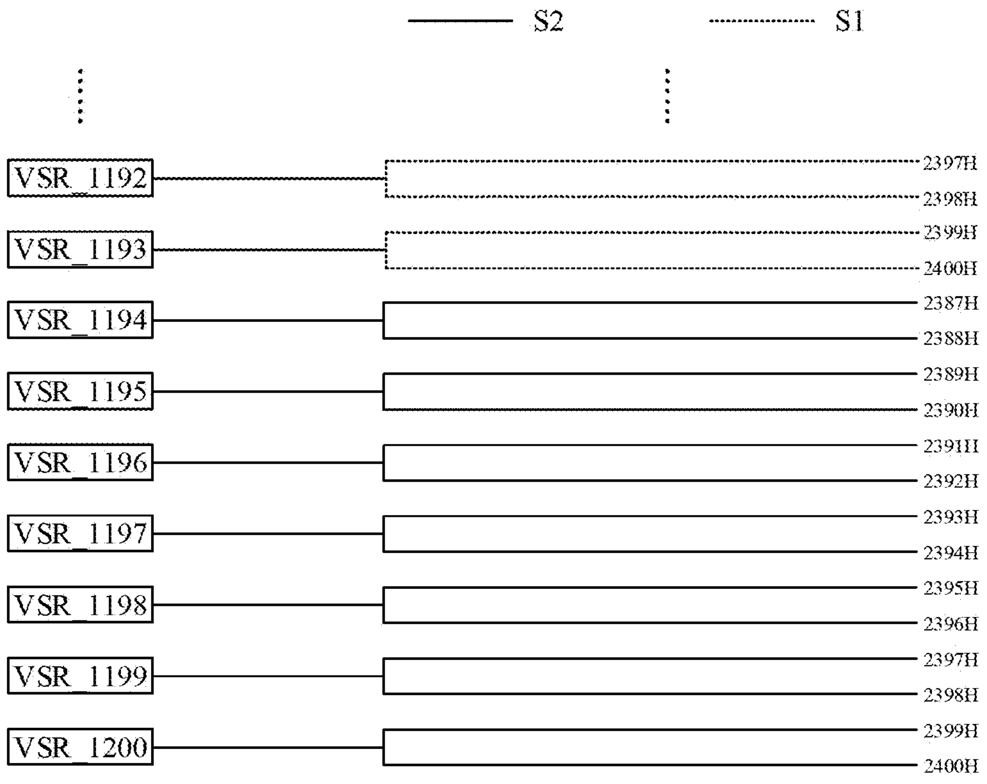
Figure 3:
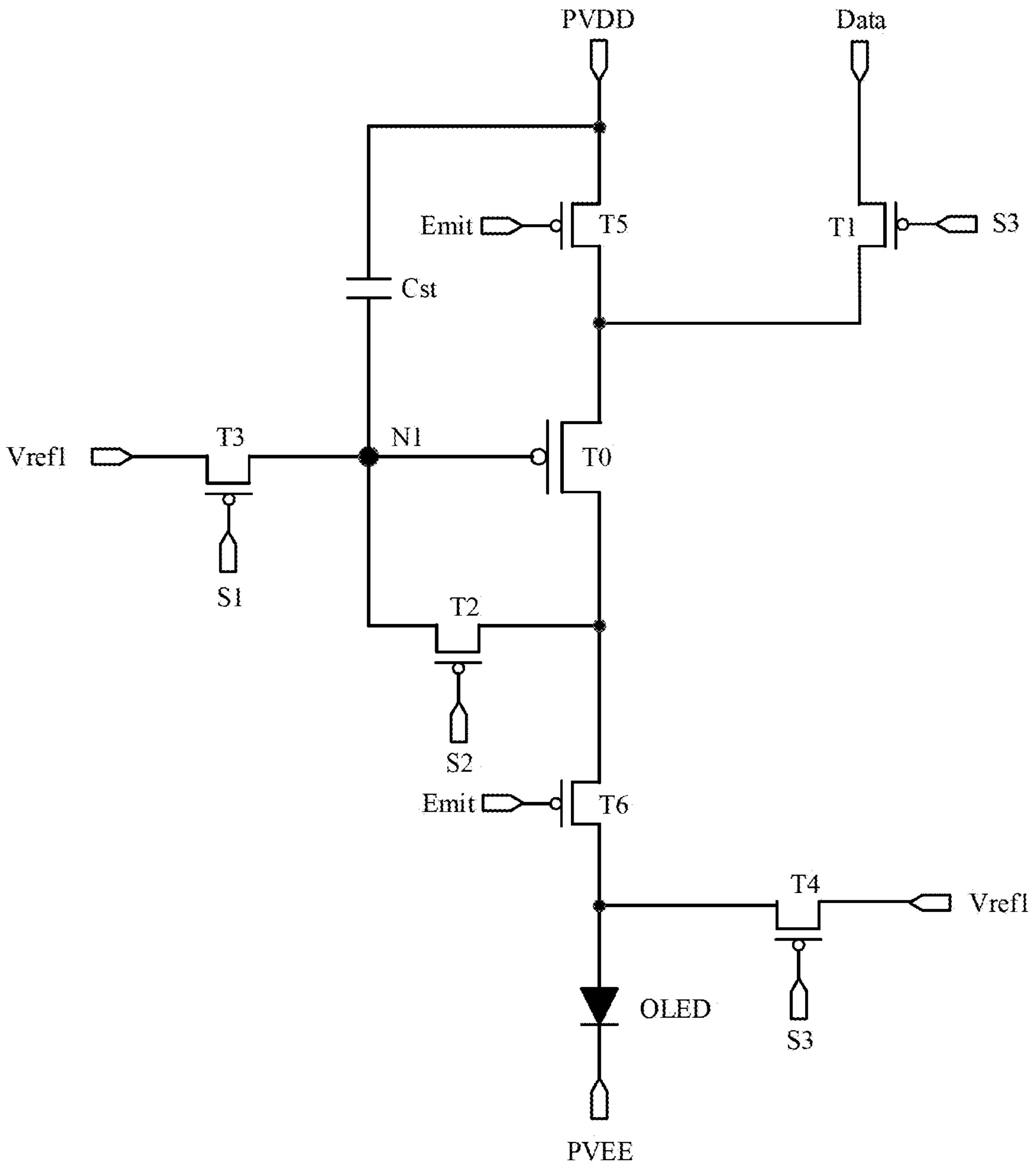
FIG. 3 is a structural diagram of a pixel driving circuit of a display panel.
Figure 4:
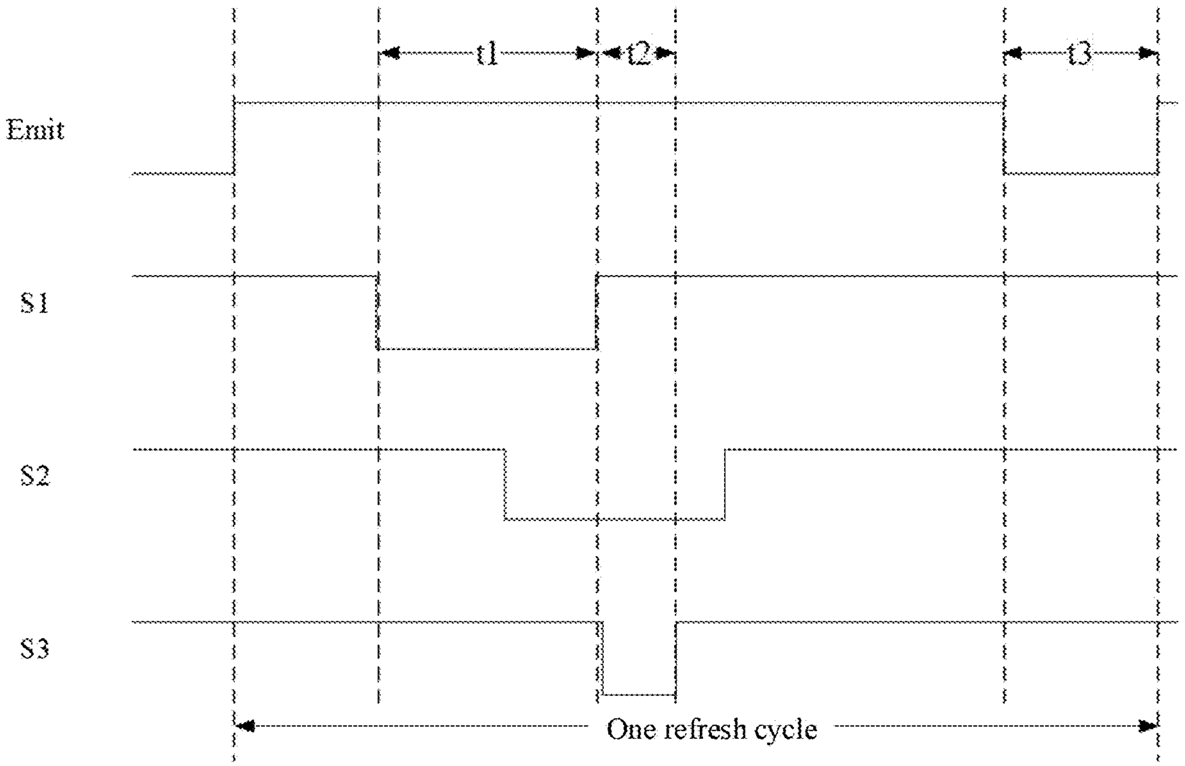
FIG. 4 is a drive timing diagram of a pixel driving circuit shown in FIG. 3.

FIGS. 1 and 2 are schematic diagrams of gate driving relationships in different regions of a display panel. FIG. 3 is a structural diagram of a pixel driving circuit of a display panel. FIG. 4 is a drive timing diagram of a pixel driving circuit shown in FIG. 3. Referring to FIGS. 1 to 4, as described in the BACKGROUND, in some display panels, shift registers VSR disposed in the bezel region synchronously drive multiple adjacent pixel rows H, that is, the shift registers VSR provide same scan signals for same scan signal lines of multiple adjacent pixel rows H. In the example shown in FIG. 1, the first shift register VSR_1 simultaneously provides same scan signals for second scan signal lines S2 of the first pixel row 1H and the second pixel row 2H. Referring to FIG. 3, those skilled in the art can know that at this time, the pixel row 1H and the pixel row 2H are driven by the same scan signals on the second scan signal lines S2 and are in the same stage of a refresh cycle, that is, a data write stage. Therefore, the same shift register VSR_1 can synchronously drive multiple adjacent pixel rows H, that is, a drive mode in which one shift register drives multiple pixel rows is adopted, thereby reducing the number of shift registers VSR.

In addition, with continued reference to FIG. 1, in some display panels, it is also feasible that the shift register VSR in the bezel region is configured to simultaneously provide same scan signals for one scan signal line in one pixel row H and another scan signal line in another pixel row H, and the pixels in the two pixel rows H are driven by the scan signals on different scan signal lines and are separately in different drive stages. For example, as shown in FIG. 1, the first shift register VSR_1 simultaneously provides same scan signals for the second scan signal line S2 in the first pixel row 1H and a first scan signal line S1 in the fifteenth pixel row 15H. At this time, the pixels in the pixel row 1H are driven by the scan signal transmitted on the second scan signal line S2 and are in a data write stage t2 of the refresh cycle; and the pixels in the pixel row 15H are driven by the scan signal transmitted on the first scan signal line S1 and are in an initialization stage t1 of the refresh cycle. Therefore, the same shift register VSR can simultaneously drive two pixel rows separated by a certain number of rows to be in different stages, that is, a mode in which one shift register drives two pixel rows separated by a certain number of rows is adopted, thereby reducing the number of shift registers VSR.

To sum up, the same shift register VSR, such as the first shift register VSR_1, simultaneously drives the first pixel row 1H, the second pixel row 2H, the fifteenth pixel row 15H, and the sixteenth pixel row 16H, so as to achieve a drive mode in which one shift register drives four pixel rows, thereby greatly reducing the number of shift registers VSR, which is conducive to reducing the area occupied by a gate driving circuit in the bezel region and reducing the bezel region.

Based on the preceding drive design of the shift registers, for all the pixel rows in the display panel, through a corresponding number of shift registers VSR, in the mode in which one shift register drives multiple pixel rows, the scan signals are correspondingly provided for the second scan signal lines S2 of all the pixel rows H, and at the same time, in the mode in which one shift register drives two pixel rows separated by a certain number of rows, the scan signals are correspondingly provided for the first scan signal lines S1 of all the pixel rows H. However, the last shift register VSR_1200 is used as an example, and the last shift register VSR_1200 provides the scan signals for only the second scan signal lines S2 of the two last pixel rows 2399H and 2400H. The display panel does not have a pixel row for the last shift register VSR_1200 to synchronously provide the scan signal for the first scan signal line S1 of the pixel row. The last shift register VSR_1200 has only a drive quantity relationship in which one shift register drives two pixel rows. Compared with the first shift register VSR_1 or the general shift register VSR having a drive quantity relationship in which one shift register drives four pixel rows, some shift registers VSR at the end position have only the drive quantity relationship in which one shift register drives two pixel rows, the number of loads connected to the shift register VSR at the end position is less than the number of loads connected to the general shift register VSR, and the brightness of the corresponding pixel row H is relatively high, resulting in the over-brightness of several pixel rows at the end of the display panel and relatively poor display uniformity.

Based on the preceding problems, embodiments of the present disclosure provide a display panel. The display panel includes a display region and a bezel region surrounding the display region, where the bezel region includes a shift register region and a compensation region, and the shift register region is located on at least one side of the display region in a first direction.

The display region includes multiple display pixel groups, a display pixel group of the multiple of display pixel groups includes multiple first pixel units arranged in sequence along the first direction, and the multiple display pixel groups are arranged in sequence along a second direction, where the first direction intersects with the second direction.

The shift register region includes first shift register units and second shift register units, where a first shift register unit is electrically connected to m display pixel groups, and a second shift register unit is electrically connected to n display pixel groups, where m and n are positive integers, and m>n.

The compensation region includes load compensation units electrically connected to the second shift register units.

The first direction and the second direction may be understood as the row direction and the column direction of the display panel, respectively. Therefore, the display pixel group represents the pixel row, the first shift register unit may be understood as the general shift register adopting the mode in which one shift register drives multiple pixel rows, and the number of driving pixel rows is m. The second shift register unit is electrically connected to n display pixel groups, and m>n, which means that the second shift register unit is a shift register with a different number of driving display pixel groups, that is, a shift register with a relatively small number of driving display pixel groups. Based on this, in the embodiment of the present disclosure, the load compensation units are provided and electrically connected to the second shift register units so that the load compensation can be performed on the second shift register units connected to a relatively small number of display pixel groups. In this manner, the problems of a relatively small number of pixel rows driven by some shift registers and relatively small loads in the display panel are solved, it is ensured that the loads of the shift register units are basically the same, and the pixels in the display pixel groups connected to the shift register units have basically the same brightness, so as to avoid excessive differences in the brightness of the first pixel units in the display pixel groups connected to the two types of shift register units, thereby improving the display uniformity of the display panel.

The technical solutions in embodiments of the present disclosure are described clearly and completely hereinafter in conjunction with the drawings in the embodiments of the present disclosure. Based on the embodiments of the present disclosure, all other embodiments obtained by those of ordinary skill in the art on the premise that no creative work is done are within the scope of the present disclosure.

Figure 5:
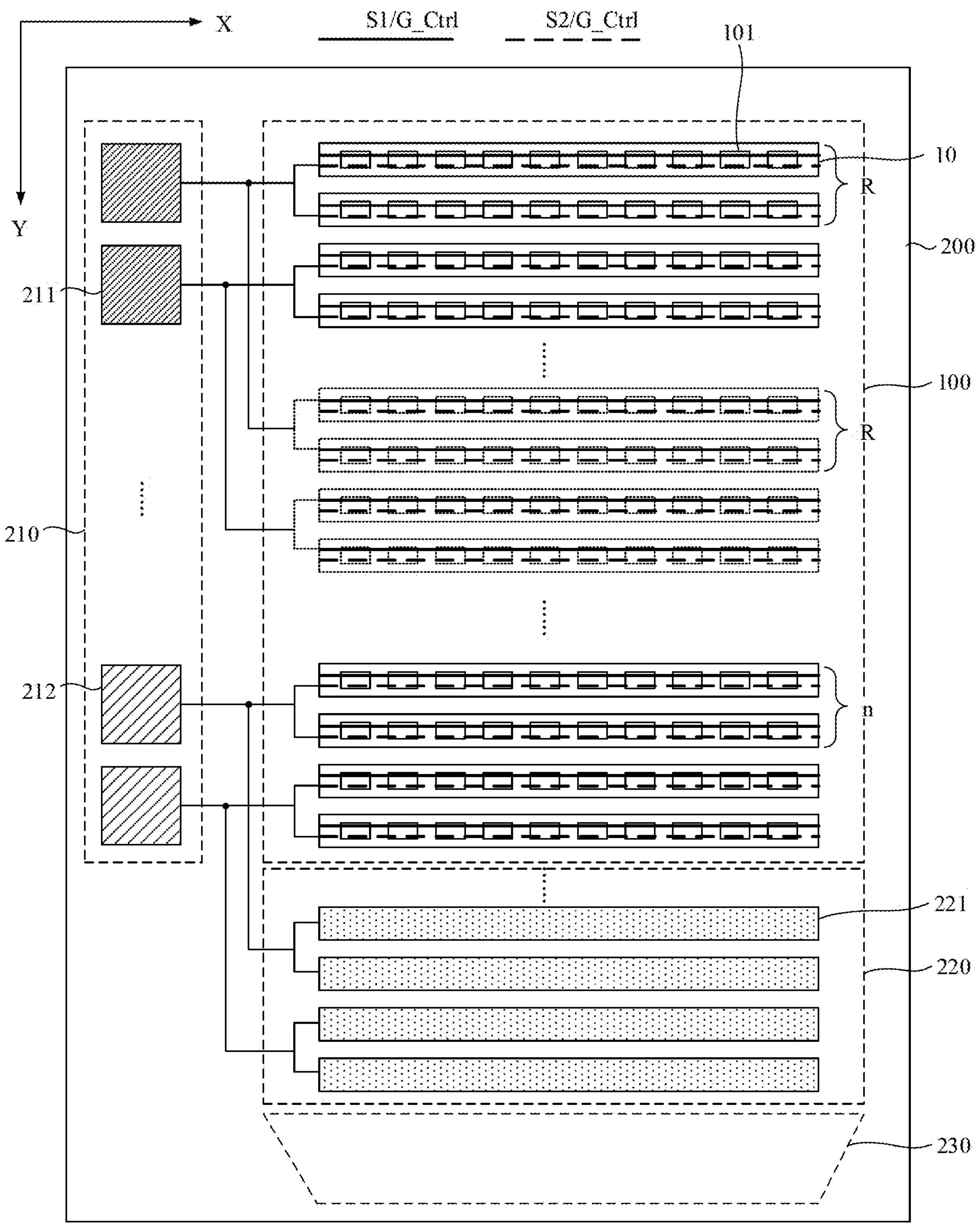
FIGS. 5 and 6 are structural diagrams of two display panels according to embodiments of the present disclosure.
Figure 6:
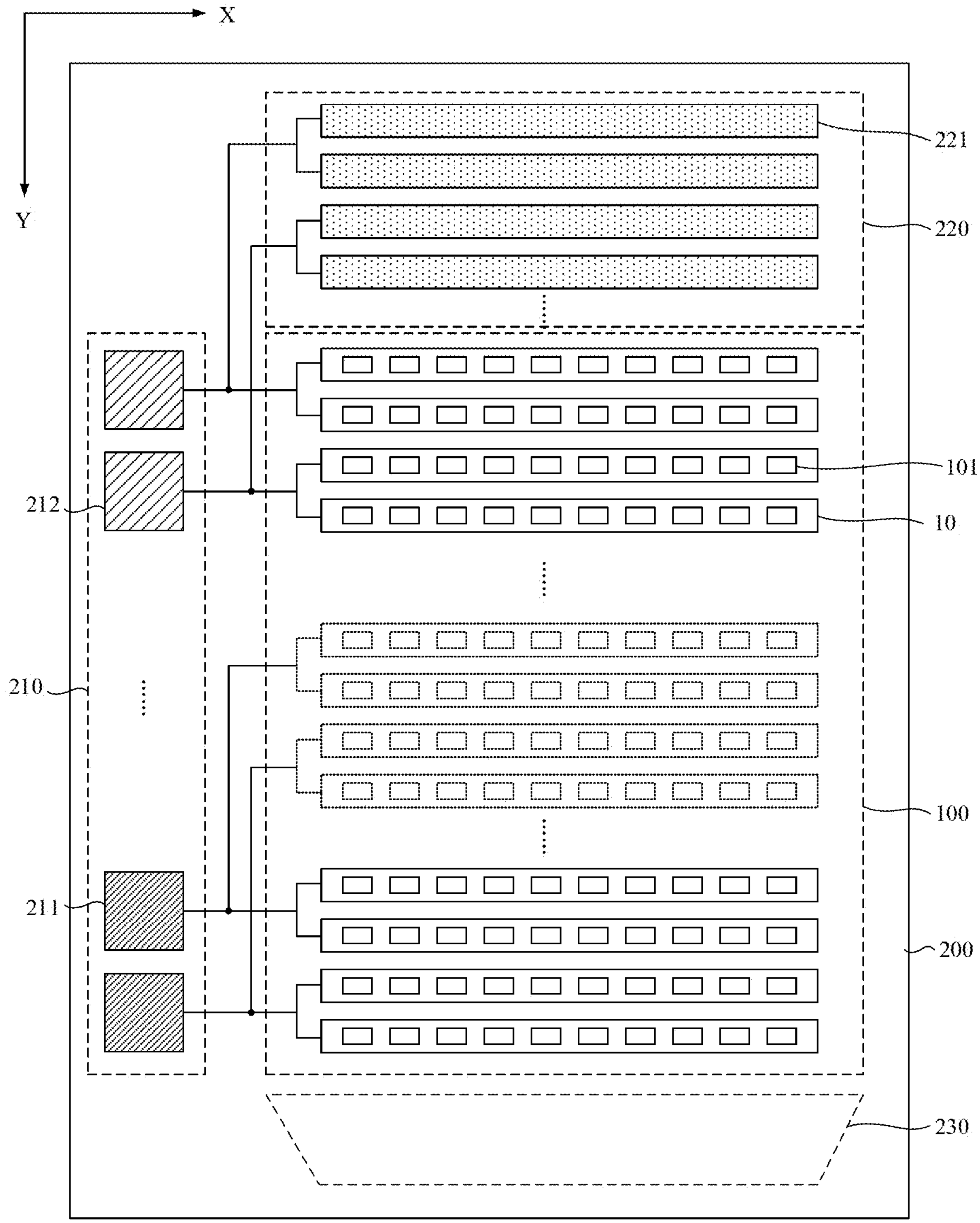

FIGS. 5 and 6 are structural diagrams of two display panels according to embodiments of the present disclosure. Referring to FIGS. 5 and 6, the display panel includes a display region 100 and a bezel region 200 surrounding the display region 100, where the bezel region 200 includes a shift register region 210 and a compensation region 220, and the shift register region 210 is located on at least one side of the display region 100 in a first direction X.

The display region 100 includes a plurality of display pixel groups 10, the display pixel group 10 includes a plurality of first pixel units 101 arranged in sequence along the first direction X, and the plurality of display pixel groups 10 are arranged in sequence along a second direction Y, where the first direction X intersects with the second direction Y.

The shift register region 210 includes first shift register units 211 and second shift register units 212, where the first shift register unit 211 is electrically connected to m display pixel groups 10, and the second shift register unit 212 is electrically connected to n display pixel groups 10, where m and n are positive integers, and m>n.

The compensation region 220 includes load compensation units 221 electrically connected to the second shift register units 212.

First, the display region 100 is provided with the pixel units arranged in rows and columns in an array, that is, the first pixel units 101. For example, the first direction X is the row direction, and then multiple first pixel units 101 arranged in sequence along the first direction X form one display pixel group 10, that is, one pixel row. The first pixel unit 101 may be understood as a sub-pixel, such as a red sub-pixel, a green sub-pixel, or a blue sub-pixel. The first pixel unit 101 includes a light-emitting element of a corresponding color and a pixel driving circuit driving the light-emitting element to emit light. In the display panel, the full-color display can be achieved through the color coordination of the sub-pixels. For the pixel units in the display region 100, a gate driving circuit needs to be provided in the shift register region 210 of the bezel region 200 and is configured to provide the scan signal for the pixel driving circuit in each pixel unit to drive the pixel unit. The shift register region 210 is generally disposed on one side or two sides of the display region 100 in the first direction X, that is, the row direction. Multiple cascaded shift register units configured to drive the pixel units in multiple pixel rows in sequence are disposed in the shift register region 210.

In addition, the first shift register units 211 and the second shift register units 212 are disposed in the shift register region 210. The first shift register unit 211 is electrically connected to m display pixel groups 10 (for example, m=4 in FIG. 5), the second shift register unit 212 is electrically connected to n display pixel groups 10 (for example, n=2 in FIG. 5), and m is greater than n, indicating that the number of the display pixel groups 10 electrically connected to the shift register unit, that is, the second shift register, is less than the number of the display pixel groups 10 electrically connected to the first shift register unit 211. As can be seen from this, the number of loads connected to the second shift register unit 212 is relatively small. In the embodiment of the present disclosure, the compensation region 220 is disposed in the bezel region 200, and the load compensation units 221 are disposed in the compensation region 220, are connected to the second shift register units 212, and can serve as the loads and compensate the loads connected to the second shift registers 212. In this manner, the loads connected to the first shift register units 211 and the second shift register units 212 are relatively balanced or even completely consistent, it is ensured that the loads of the shift register units are basically the same, and the brightness of the pixels in the display pixel groups connected to the shift register units are basically the same, so as to avoid excessive differences in brightness of the first pixel units 101 in the display pixel groups 10 connected to the two types of shift register units, thereby improving the display uniformity of the display panel.

Further, it is to be noted that, as shown in FIG. 3, those skilled in the art can know that the pixel unit in the display pixel group includes an organic light-emitting element (OLED) and a pixel driving circuit driving the OLED to emit light. Here, the electrical connection between the shift register unit and the display pixel group refers to the electrical connection between the shift register unit and the corresponding pixel driving circuits in the display pixel group, rather than the direct electrical connection between the shift register unit and the OLED in the display pixel group.

Further, for example, the compensation region 220 in the embodiment of the present disclosure may be disposed on one side or two sides of the display region 100 in the second direction Y, that is, the column direction. More specifically, in the display panel in the embodiment of the present disclosure, the bezel region 200 further includes a fan-out region 230, where as shown in FIG. 5, the compensation region 220 may be located between the fan-out region 230 and the display region 100; or as shown in FIG. 6, the compensation region 220 may be located on a side of the display region 100 facing away from the fan-out region 230. Of course, those skilled in the art can also set the position and setting manner of the compensation region 220 shown in FIGS. 5 and 6 according to the actual design requirements of the bezel region, which is not limited in the embodiment of the present disclosure. In addition, the connection relationship between the shift register units and the rows of display pixel groups and the arrangement positions shown in FIG. 6 are only for illustration and are not limiting.

With continued reference to FIG. 5, more specifically, the display panel includes multiple gate control signal lines G_Ctrl extending along the first direction X, where the multiple gate control signal lines G_Ctrl include first scan signal lines S1 and second scan signal lines S2; the first shift register unit 211 is connected to R adjacent display pixel groups 10 through R first scan signal lines S1 and is connected to another R adjacent display pixel groups 10 through R second scan signal lines S2, where R=m/2. The second shift register unit 212 is connected to the n adjacent display pixel groups 10 through n second scan signal lines S2; where the display pixel groups 10 connected to the first shift register unit 211 and the display pixel groups 10 connected to the second shift register unit 212 are different.

For the first shift register units 211, in the example shown FIG. 5, R=2, indicating that each first shift register unit 211 is separately connected to two first scan signal lines S1 in two display pixel groups 10 and at the same time, connected to two second scan signal lines S2 in another two display pixel groups 10. Each first shift register unit 211 here adopts a driving relationship in which one shift register unit drives four display pixel groups 10, and m is actually equal to 4. Referring to FIGS. 3 and 5, it can be seen that the two display pixel groups 10 connected through the first scan signal lines S1 are synchronously controlled and driven by the scan signals of the first shift register unit 211, and the two display pixel groups 10 connected through the second scan signal lines S2 are synchronously controlled and driven by the scan signals of the first shift register unit 211, that is, the display pixel groups 10 connected through the first scan signal lines S1 are in the same stage of the same refresh cycle and the display pixel groups 10 connected through the second scan signal lines S2 are in the same stage of the same refresh cycle; and the display pixel groups 10 separately connected through the first scan signal lines S1 and the second scan signal lines S2 are separately controlled and driven by the scan signals of the first shift register unit 211 and are in different stages of the same refresh cycle, the display pixel groups 10 connected through the first scan signal lines S1 are in the initialization stage, and the display pixel groups 10 connected through the second scan signal lines S2 are in the data write stage.

The number of the display pixel groups 10 connected to the second shift register unit 212 is relatively small and is n, the case where n=2 is used as an example in the figure, and all the n display pixel groups 10 are connected to the second shift register 212 through the n second scan signal lines S2, rather than the first scan signal lines S1. It can also be seen from this comparison that since the display region 100 does not have the display pixel groups 10 for the second shift register unit 212 to be connected through the first scan signal lines S1, the number of the display pixel groups 10 connected to the second shift register unit 212 is relatively small.

Figure 7:
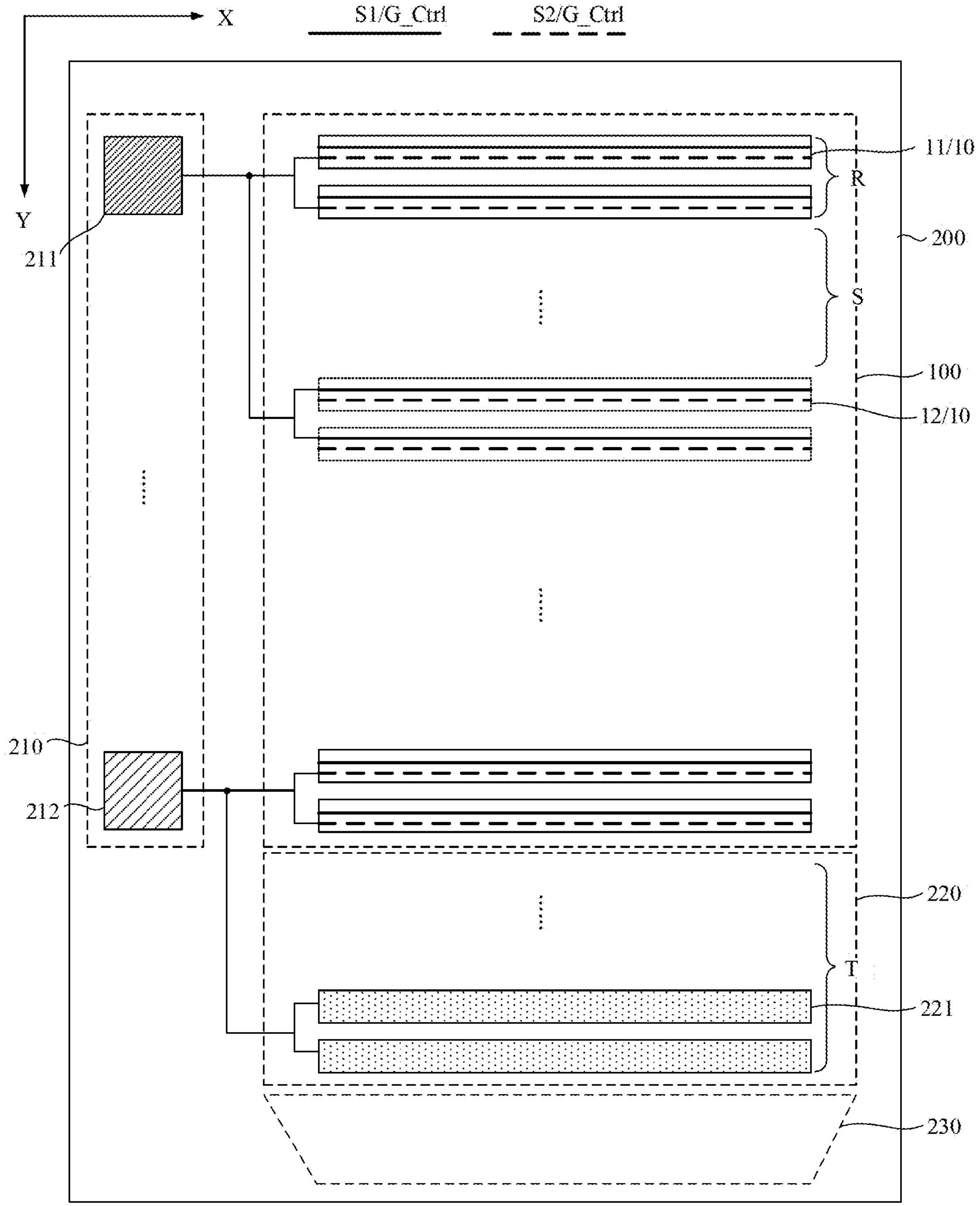
FIG. 7 is a structural diagram of another display panel according to an embodiment of the present disclosure.

FIG. 7 is a structural diagram of another display panel according to an embodiment of the present disclosure. Referring to FIG. 7, optionally, the display pixel group 10 where the second scan signal line S2 electrically connected to the first shift register unit 211 is located is a first display pixel group 11, the display pixel group 10 where the first scan signal line S1 electrically connected to the first shift register unit 211 is located is a second display pixel group 12, and the first display pixel group 11 and the second display pixel group 12 that are adjacent are spaced by S display pixel groups 10; where R and S are both positive integers, and S is an integer multiple of R; where the compensation region 220 includes T load compensation units 221, where every R adjacent load compensation units 221 are electrically connected to the second shift register unit 212, and T=R+S.

According to the connection manner and connection relationship between the first shift register units 211, the second shift register units 212, and the display pixel groups 10, it can be deduced that the number of the load compensation units 221 disposed in the compensation region 220 essentially depends on the number of the display pixel groups 10 between the display pixel group 10 electrically connected to the first shift register unit 211 through the second scan signal line S2 and the display pixel group 10 electrically connected to the first shift register unit 211 through the first scan signal line S1, that is, depends on the number S of the display pixel groups 10 between the first display pixel group 11 and the second display pixel group 12 that are adjacent, and also depends on the number R of the display pixel groups 10 electrically connected to each first shift register unit 211 through the same type of scan signal lines. Corresponding to the driving relationship in FIGS. 1 and 2, for example, R=2, and S=12. At this time, (R+S)/R=7 second shift register units 212 exist. Corresponding to the seven second shift register units 212, the derivation relationship of the number T of the load compensation units 221 that need to be disposed correspondingly in the compensation region 220 is as follows: T=(R+S)/R×R=R+S, that is, T=14.

Figure 8:
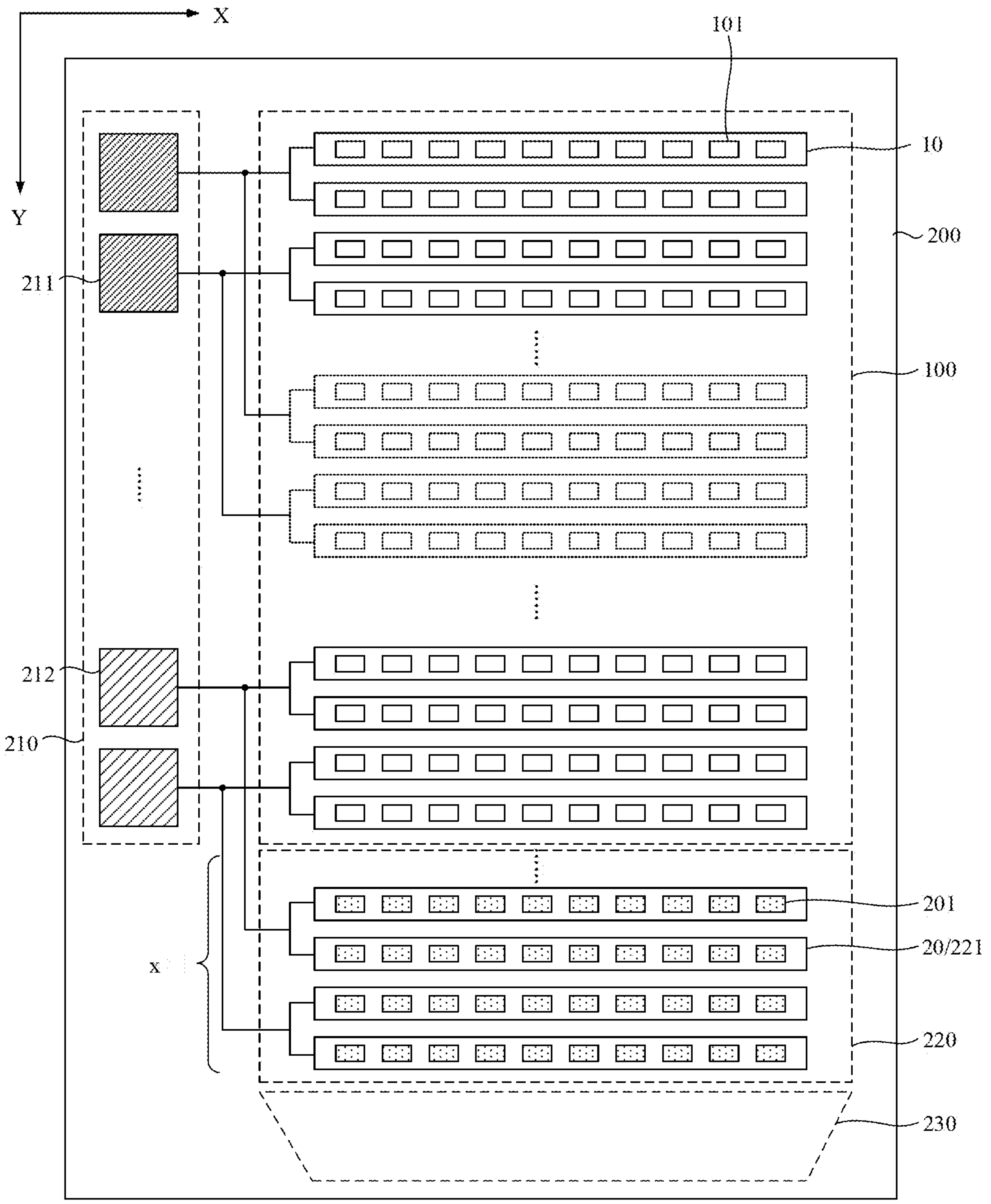
FIG. 8 is a structural diagram of another display panel according to an embodiment of the present disclosure.

Considering that the preceding connection manner in which one shift register unit drives four display pixel groups is a special example, the embodiment of the present disclosure also provides a manner of setting the compensation units for general situations. FIG. 8 is a structural diagram of another display panel according to an embodiment of the present disclosure. Referring to FIG. 8, optionally, the load compensation unit 221 includes a compensation pixel group 20, the compensation pixel group 20 includes multiple second pixel units 201 arranged in sequence along the first direction X, and the second shift register unit 212 is electrically connected to x compensation pixel groups 20, where x is a positive integer, and m=n+x.

In this embodiment, except that no light-emitting element is provided or the light-emitting element has no anode and cannot be driven to emit light, the compensation pixel group 20 may be configured to have an internal structure that is completely consistent with the internal structure of the display pixel group 10 of the display region 100, the second pixel unit 201 may be configured to have an internal structure, that is, a pixel circuit, that is completely consistent with that of the first pixel unit 101 of the display region 100, and the difference is that the second pixel unit 201 is disposed in the compensation region 220 in the bezel region 200 and is connected to the second shift register unit 212. Therefore, the number of pixel rows connected to the second shift register unit 212 is the same as the number of pixel rows connected to the first shift register unit 211, both of which are m, thereby ensuring that the second shift register unit 212 and the first shift register unit 211 have the consistent loads and the brightness of the correspondingly driven pixel rows in the display region 100 is the same. It is to be added that since in the compensation pixel group 20 and the second pixel units 201 in the compensation pixel group 20, no light-emitting element is provided or the light-emitting element has no anode and cannot be driven to emit light, these pixel units disposed in the compensation region do not emit light, not affecting the normal display of the display region.

In other embodiments of the present disclosure, optionally, the preceding second pixel unit may be further specially designed to be different from the first pixel unit that needs to have a display function in the display region.

Figure 9:
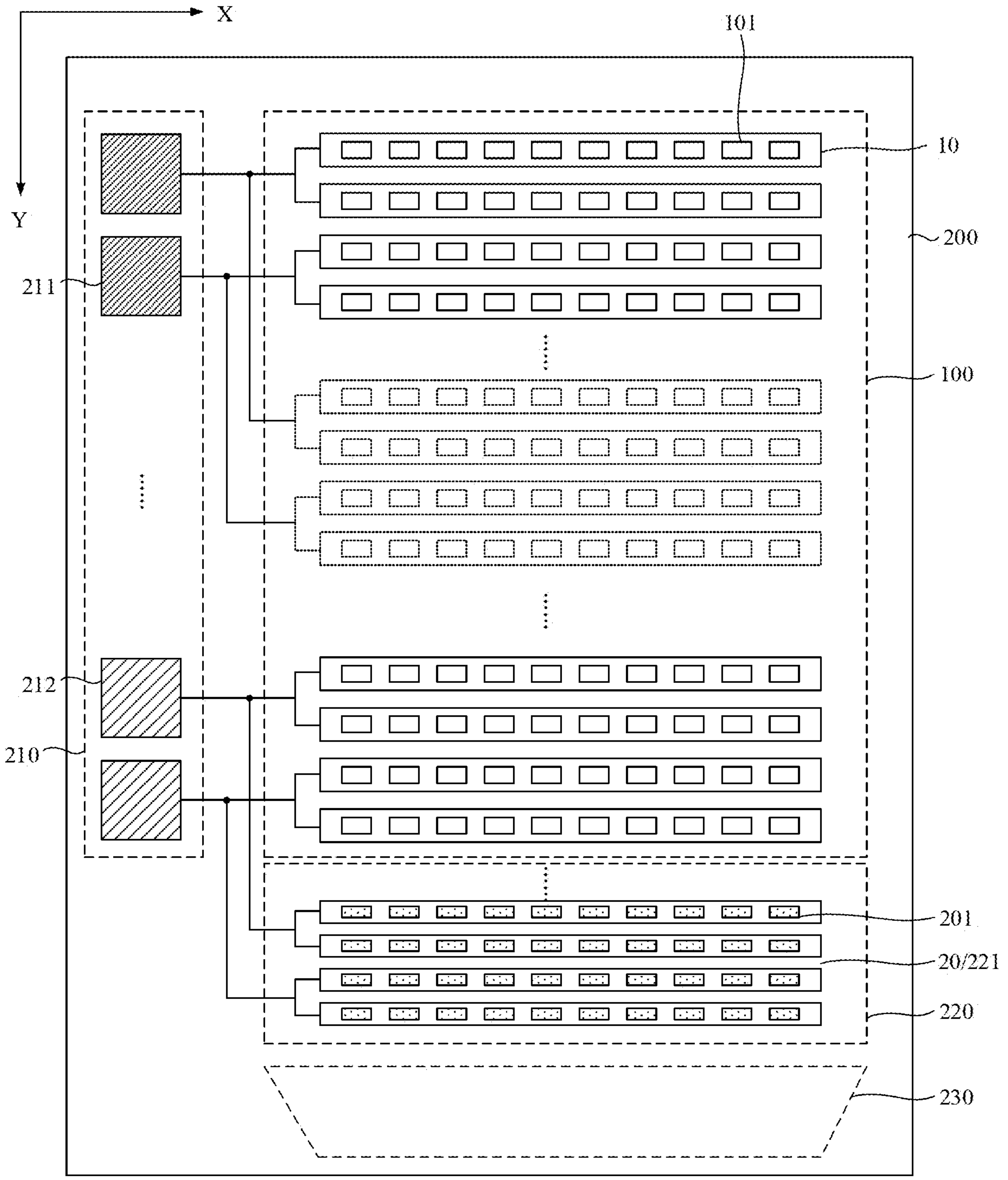
FIG. 9 is a structural diagram of another display panel according to an embodiment of the present disclosure.

FIG. 9 is a structural diagram of another display panel according to an embodiment of the present disclosure. Referring to FIG. 9, in an embodiment, optionally, the length of the second pixel unit 201 in the second direction Y is less than the length of the first pixel unit 101 in the second direction Y. In this case, the length of the second pixel unit 201 located in the bezel region 200 in the second direction Y is essentially reduced appropriately, thereby reducing the area occupied by the compensation pixel group 20 in the bezel region 200, which is conducive to achieving a narrow bezel design.

Figure 10:
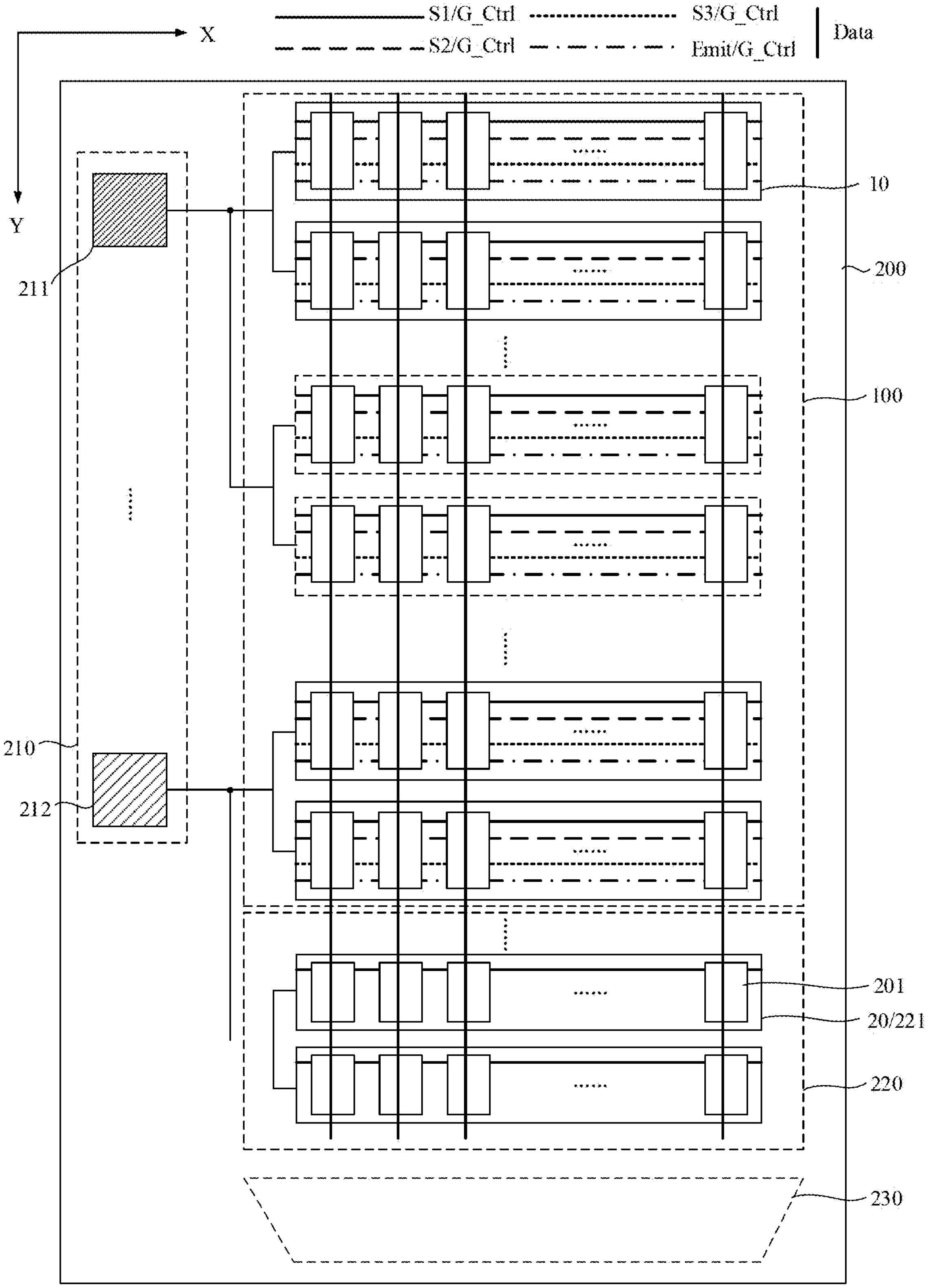
FIG. 10 is a structural diagram of another display panel according to an embodiment of the present disclosure.

FIG. 10 is a structural diagram of another display panel according to an embodiment of the present disclosure. Referring to FIG. 10, in another embodiment of the present disclosure, optionally, the first pixel unit 101 and the second pixel unit 201 each include a data signal line Data extending along the second direction Y and the gate control signal lines G_Ctrl extending along the first direction X, where the gate control signal lines G_Ctrl intersect with the data signal line Data; where the number of the gate control signal lines G_Ctrl in the second pixel unit 201 is less than the number of the gate control signal lines G_Ctrl in the first pixel unit 101. More specifically, the gate control signal lines G_Ctrl include the first scan signal line S1, the second scan signal line S2, a third scan signal line S3, and a light emission control signal line Emit. Optionally, the first pixel unit 101 includes the first scan signal line S1, the second scan signal line S2, the third scan signal line S3, and the light emission control signal line Emit, and the second pixel unit 201 includes the first scan signal line S1.

In the embodiment of the present disclosure, the first scan signal line S1 in the second pixel unit 201 is retained so that the load on the first scan signal line S1 connected to the second shift register unit 212 can be consistent with the load on the first scan signal line S1 connected to the first shift register unit 211, thereby solving the problem of bright lines at the bottom of the panel. Part or all of the gate control signal lines G_Ctrl other than the first scan signal line S1 in the second pixel unit 201 are removed so that on the one hand, it is conducive to reducing the length of the second pixel unit 201 in the column direction and reducing the bezel of the display panel; on the other hand, the following is avoided: excessive gate control signal lines G_Ctrl overlap the data signal line Data in the additional second pixel unit 201, the capacitors are added to the data signal line Data, and the data signal is affected too much. For example, in the second pixel unit 201, except for the first scan signal line S1 connected to the second shift register unit 212, all other gate control signal lines extending along the first direction X, that is, the row direction, may be removed, that is, the second scan signal line S2, the third scan signal line S3, and the light emission control signal line Emit are not disposed in the second pixel unit 201. In this manner, while the bezel of the display panel is reduced, the following is avoided: the second scan signal line S2, the third scan signal line S3, and the light emission control signal line Emit overlap the data signal line Data in the second pixel unit 201 to form capacitors, affecting the data signal. In addition, one or two of the second scan signal line S2, the third scan signal line S3, and the light emission control signal line Emit may be retained in the second pixel unit 201 according to actual requirements. For example, the gate control signal line G_Ctrl that has a relatively small impact on the data signal line Data is retained, and the gate control signal line G_Ctrl that has a relatively large impact on the data signal line Data is removed, which is not limited in the embodiment of the present disclosure.

Figure 11:
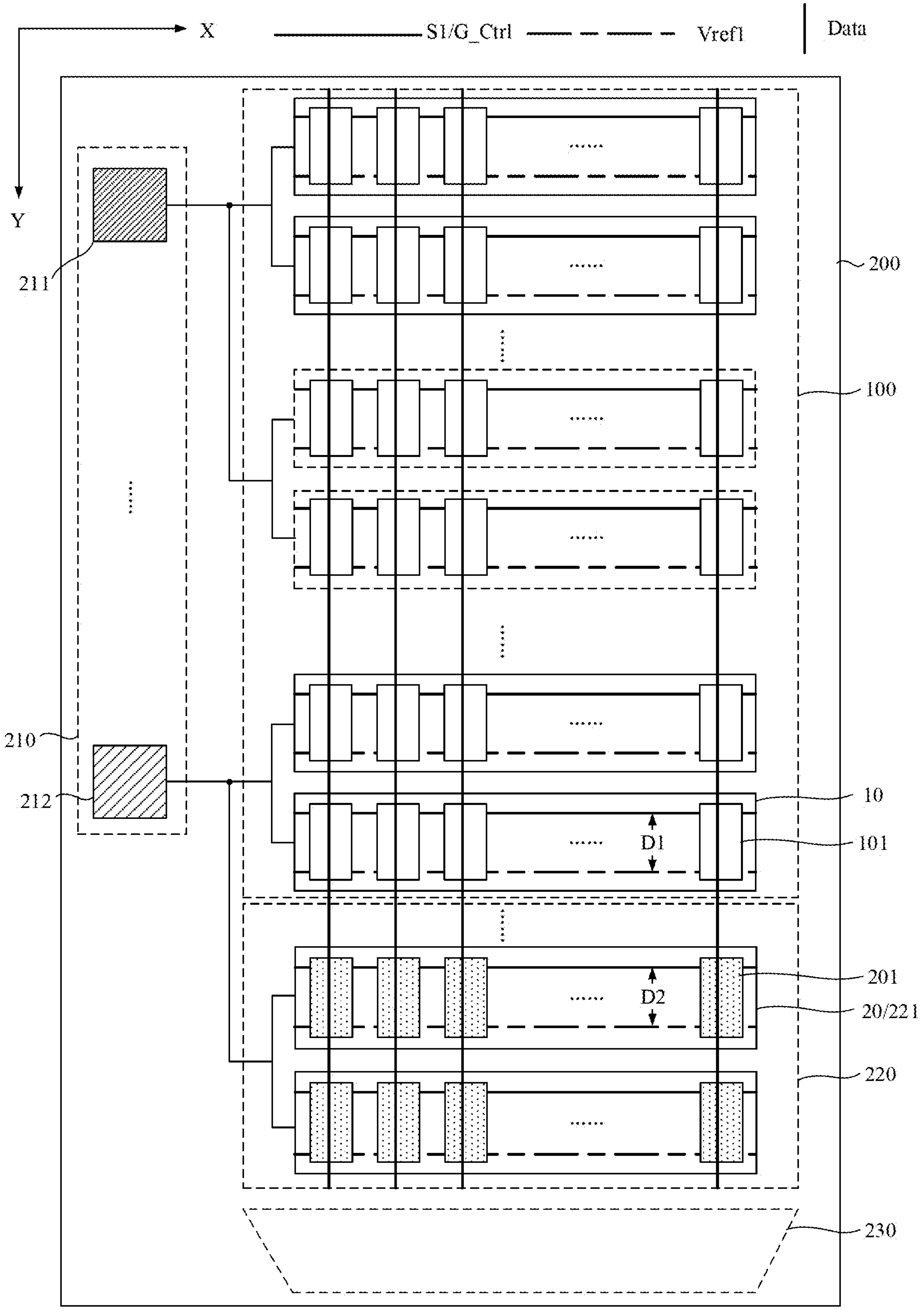
FIG. 11 is a structural diagram of another display panel according to an embodiment of the present disclosure.

FIG. 11 is a structural diagram of another display panel according to an embodiment of the present disclosure. Referring to FIG. 11, in another embodiment of the present disclosure, optionally, the first pixel unit 101 and the second pixel unit 201 each include at least one first reference signal line Vref1; where the first reference signal line Vref1 extends along the first direction X and is located on a side of the first scan signal line S1 in the second direction Y. Further, optionally, the distance D1 between the first reference signal line Vref1 and the first scan signal line S1 in the first pixel unit 101 is equal to the distance D2 between the first reference signal line Vref1 and the first scan signal line S1 in the second pixel unit 201. It is to be understood that some special designs in the pixel driving circuit may exist, so the first reference signal line Vref1 and the first scan signal line S1 may be non-linear. For example, some bumps or depressions may exist at the edges. Therefore, in the case where the first reference signal line Vref1 and the first scan signal line S1 are non-linear, the distance between the first reference signal line Vref1 and the first scan signal line S1 is the distance between two straight lines after the first reference signal line Vref1 and the first scan signal line S1 are appropriately regarded as the straight lines.

A signal line that is relatively close to the first scan signal line S1 and extends in parallel with the first scan signal line S1 exists in the first pixel unit 101 and is generally the first reference signal line Vref1 in practical applications. It is to be understood that since lateral capacitance exists when two adjacent signal lines extend in parallel, the load of the first scan signal line S1 connected to the first shift register unit 211 also includes the lateral capacitance. Considering that the load of the second pixel unit 201 in the compensation pixel group needs to be as consistent as possible with the load of the first pixel unit 101, when the second pixel unit 201 is set, optionally, the first scan signal line S1 extends in parallel with the first reference signal line Vref1, so as to ensure that the lateral capacitance on the first scan signal line S1 is the same as the lateral capacitance on the first reference signal line Vref1, so that the load of the second shift register unit 212 is consistent with the load of the first shift register unit 211, which is conducive to better solving the problem of bright lines at the bottom of the display panel.

Figure 12:
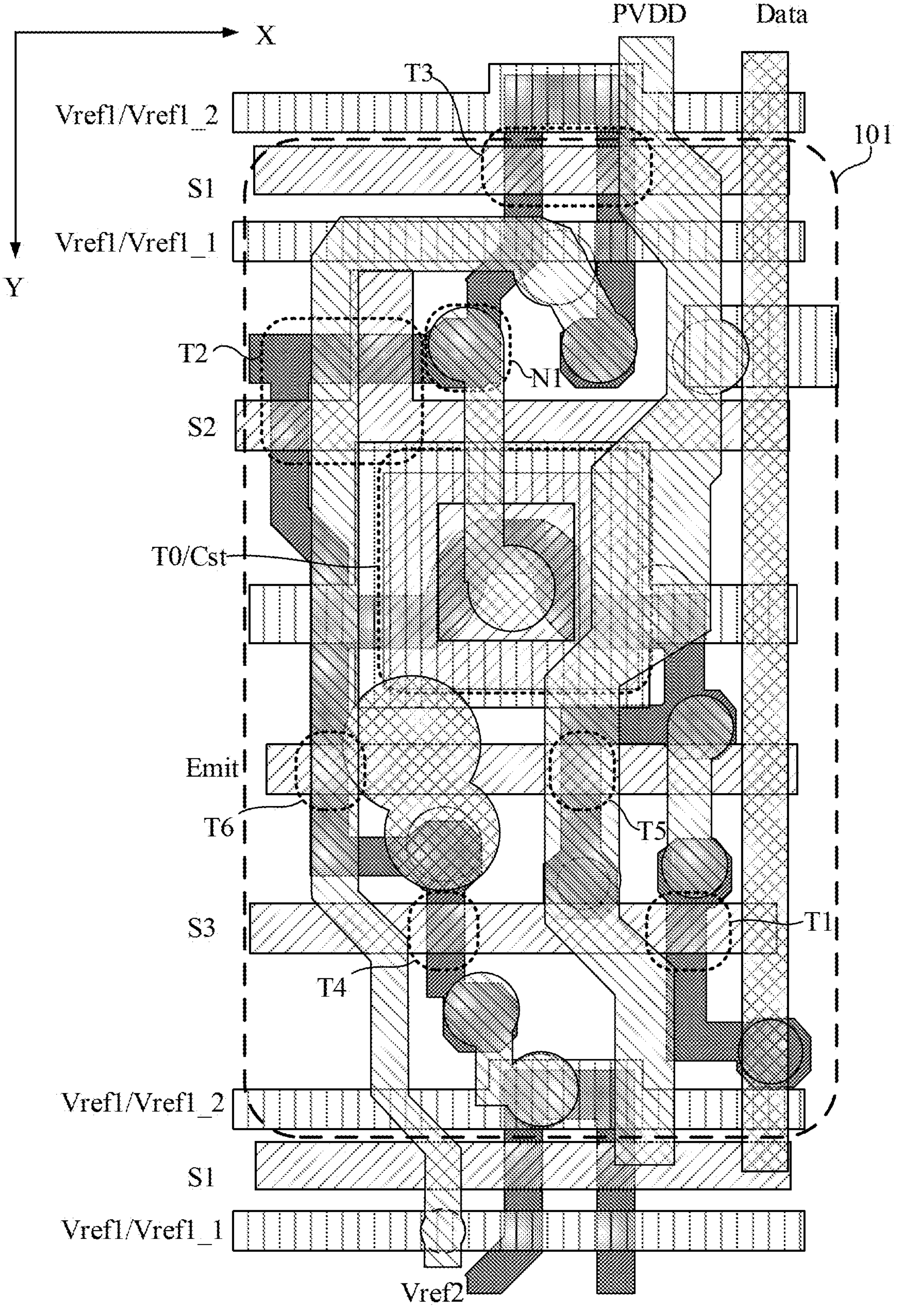
FIGS. 12 and 13 are layout diagrams of a first pixel unit and a second pixel unit in another display panel according to embodiments of the present disclosure.
Figure 13:
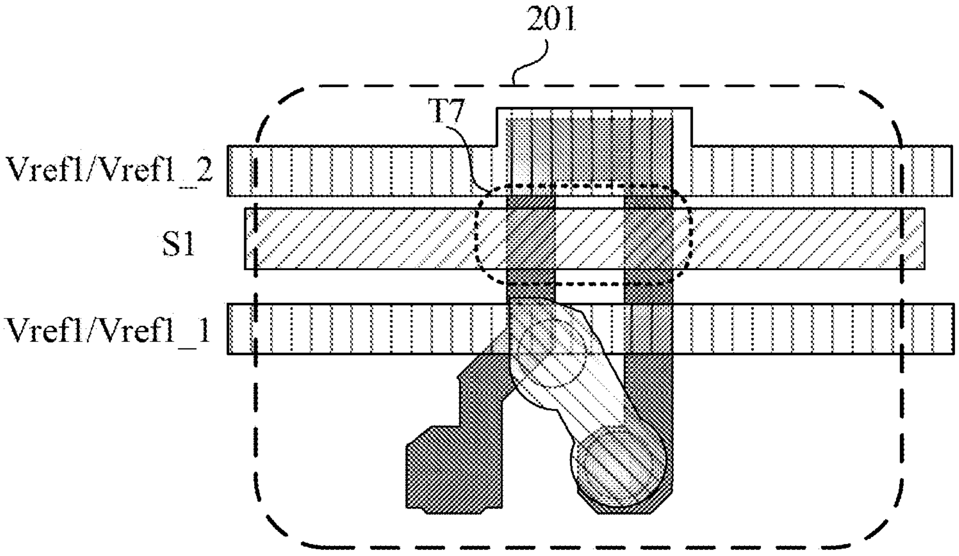

FIGS. 12 and 13 are layout diagrams of a first pixel unit and a second pixel unit in another display panel according to embodiments of the present disclosure. Referring to FIGS. 3, 12, and 13, in another embodiment of the present disclosure, optionally, the number of transistors in the second pixel unit 201 is less than the number of transistors in the first pixel unit 101. Specifically, the transistors in the first pixel unit 101 may be configured to include a drive transistor TO, a first transistor T1, a second transistor T2, a third transistor T3, a fourth transistor T4, a fifth transistor T5, and a sixth transistor T6.

A control terminal of the first transistor T1 is electrically connected to the third scan signal line S3, a first electrode of the first transistor T1 is electrically connected to a first electrode of the drive transistor TO, and a second electrode of the first transistor T1 is electrically connected to the data signal line Data.

A control terminal of the second transistor T2 is electrically connected to the second scan signal line S2, a first electrode of the second transistor T2 is electrically connected to a gate (a node N1) of the drive transistor TO, and a second electrode of the second transistor T2 is electrically connected to a second electrode of the drive transistor.

A control terminal of the third transistor T3 is electrically connected to the first scan signal line S1, a first electrode of the third transistor T3 is electrically connected to the gate (the node N1) of the drive transistor TO, and a second electrode of the third transistor T3 is electrically connected to the first reference signal line Vref1 (in the figure, for example, a first sub-reference signal line Vref1_1 in the first reference signal lines).

A control terminal of the fourth transistor T4 is electrically connected to the third scan signal line S3, a first electrode of the fourth transistor T4 is electrically connected to a first electrode of the OLED, and a second electrode of the fourth transistor T4 is electrically connected to the first reference signal line Vref1 (in the figure, for example, a second sub-reference signal line Vref1_2 in the first reference signal lines).

A control terminal of the fifth transistor T5 is electrically connected to the light emission control signal line Emit, a first electrode of the fifth transistor T5 is electrically connected to the first electrode of the drive transistor TO, and a second electrode of the fifth transistor T5 is electrically connected to a first power signal line PVDD.

A control terminal of the sixth transistor T6 is electrically connected to the light emission control signal line Emit, a first electrode of the sixth transistor T6 is electrically connected to the second electrode of the drive transistor TO, and a second electrode of the sixth transistor T6 is electrically connected to the first electrode of the OLED.

The transistors in the second pixel unit 201 include a seventh transistor T7.

A control terminal of the seventh transistor T7 is electrically connected to the first scan signal line S1, a first electrode of the seventh transistor T7 is floating, and a second electrode of the seventh transistor T7 is electrically connected to the first reference signal line Vref1 (in the figure, for example, the first sub-reference signal line Vref1_1 in the first reference signal lines).

In this embodiment, compared with the layout structure of the first pixel unit 101 shown in FIG. 12, the second pixel unit 201 shown in FIG. 13 is provided with only the first scan line S1, the first reference signal lines Vref1, and some active layer patterns to form the seventh transistor T7. The second electrode of the seventh transistor T7 is electrically connected to the first reference signal line Vref1 through a via and a jump wire. As can be seen from the comparison between FIGS. 12 and 13 above, in the actual application of the solution in the embodiment of the present disclosure, optionally, the number of transistors in the second pixel unit 201 is reduced and some signal lines are removed, thereby simplifying the structure of the pixel unit, achieving compression of the pixel unit, and preventing the compensation region from occupying an excessively large area in the bezel region, which is conducive to achieving a narrow bezel design. In addition, as shown in FIG. 13, in the embodiment of the present disclosure, the first scan signal line S1, the seventh transistor T7, and the first reference signal lines Vref1 are disposed in the second pixel unit 201, and the seventh transistor T7 may be used as a load directly electrically connected to the first scan signal line S1 so that the load is consistent with the load directly electrically connected to the first scan signal line S1 of the first pixel unit 101 in FIG. 12. At the same time, the first reference signal lines Vref1 adjacent to the first scan signal line S1 are retained and can provide the lateral capacitance for the first scan signal line S1, and the lateral capacitance is consistent with the lateral capacitance of the first scan signal line S1 of the first pixel unit 101 in FIG. 12. To sum up, the load of the first scan signal line S1 is comparable to the load of the first scan signal line S1 of the first pixel unit 101 in FIG. 12.

In this embodiment, in the second pixel unit 201, some transistors may also be removed from the second pixel unit 201 but the seventh transistor T7 is retained so that, in addition to causing the first scan signal line S1 to form a corresponding load and achieving area compression of the second pixel unit 201, the manner in which the light emission control signal line Emit, the second scan signal line S2, and the third scan signal line S3 in the second pixel unit 201 are at least partially removed in the preceding embodiment causes the following: the transistors connected to the light emission control signal line Emit, the second scan signal line S2, and the third scan signal line S3 are continuously on due to the lack of gates, causing some signal lines to be short-circuited together and affecting the normal signal transmission. For example, in the case where the light emission control signal line Emit and the third scan signal line S3 are both removed, the first transistor T1 and the fifth transistor T5 lack gates and may be regarded as wires, and then the first power signal line PVDD and the data signal line Data are short-circuited together, possibly affecting the normal transmission of the first power signal, the data signal, and the like. Therefore, in the embodiment of the present disclosure, on the basis of removing some gate control signal lines, the transistors corresponding to the removed gate control signal lines are also removed to avoid short-circuiting of various signal lines, thereby ensuring that the normal signal transmission and avoiding poor driving caused by area compression or simplification of the second pixel unit. Of course, the present disclosure is not limited to the solution of only disposing the first scan signal line S1, the seventh transistor T7, and the first reference signal lines Vref1 in the second pixel unit 201. Based on the purpose of avoiding short-circuiting of other types of signal lines due to the removal of the gate control signal lines, the solution in which the transistors are reasonably removed based on the removed gate control signal lines also falls within the scope of the present disclosure.

It is to be noted that in some embodiments, the second scan signal line S2 and the third scan signal line S3 may be the same scan signal line, that is, the first transistor T1 and the second transistor T2 in FIG. 3 may be controlled simultaneously through one scan signal line so that the first transistor T1 and the second transistor T2 are turned on and off simultaneously, and in the case where the first transistor T1 and the second transistor T2 are both turned on, the data signal is written into the gate of the drive transistor TO.

To facilitate the wiring and setting of the transistors, the first reference signal lines extending along the first direction X illustrated in FIGS. 12 and 13 may include the first sub-reference signal line Vref1_1 and the second sub-reference signal line Vref1_2. The voltage of the signal transmitted on the first sub-reference signal line Vref1_1 and the voltage of the signal transmitted on the second sub-reference signal line Vref1_2 may be the same or different, which is not limited here. The third transistor T3 is electrically connected to the first sub-reference signal line Vref1_1 through a via and receives a reference signal provided by the first sub-reference signal line Vref1_1. The fourth transistor T4 is electrically connected to the second sub-reference signal line Vref1_2 through a via and receives a reference signal provided by the second sub-reference signal line Vref1_2. The two sub-reference signal lines may be externally electrically connected to receive the same reference signal at the same time.

Further, it is to be added that in order for the pixel units in adjacent rows to receive the same reference signal, in the actual layout design, the first reference signal lines of the pixel units in adjacent rows are electrically connected, that is, a second reference signal line Vref2 extending along the second direction, that is, extending longitudinally, needs to be provided. As shown in FIG. 12, the second reference signal line Vref2 is responsible for connecting the two first sub-reference signal lines Vref1_1 through vias.

Figure 14:
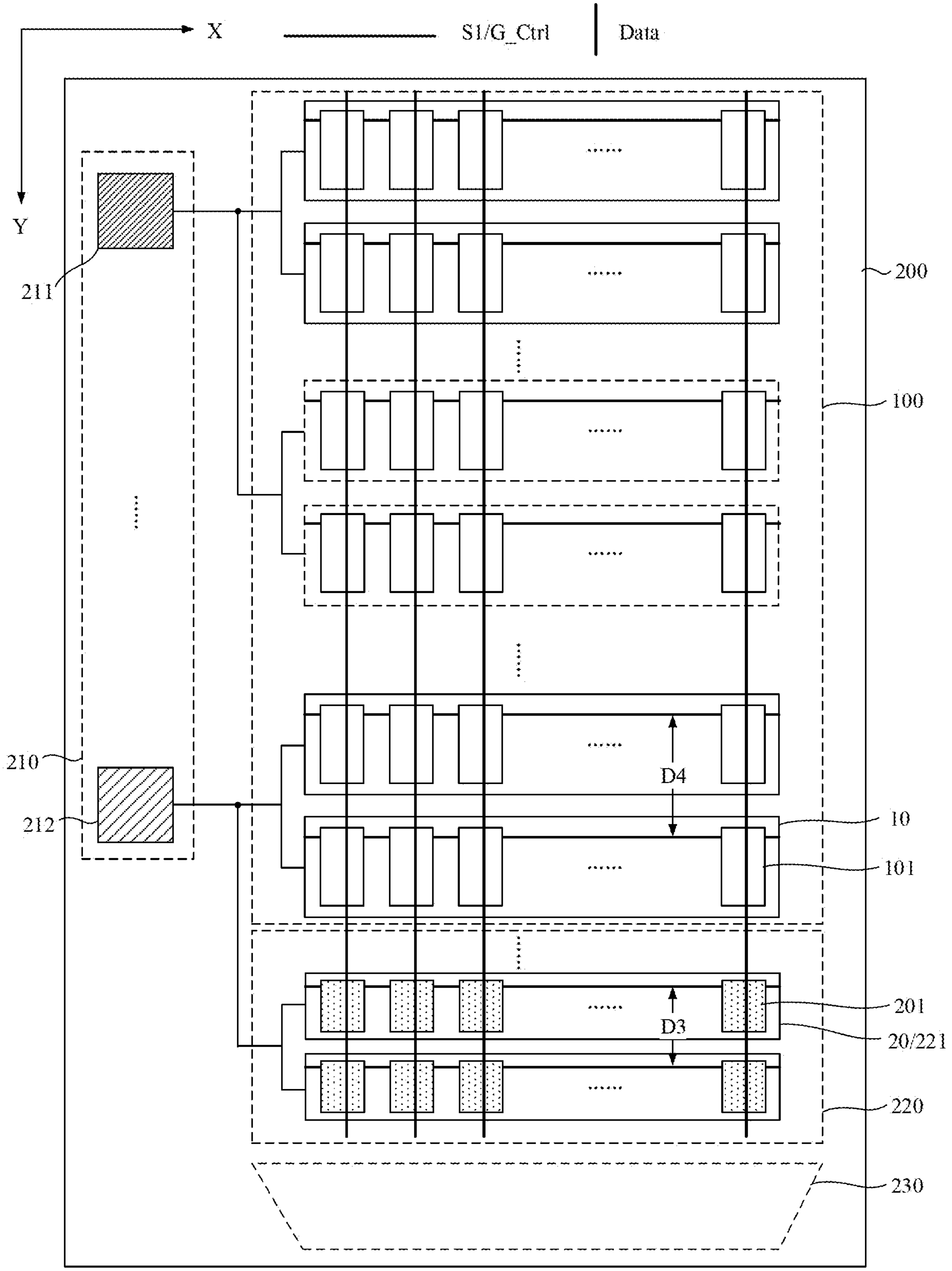
FIG. 14 is a structural diagram of another display panel according to an embodiment of the present disclosure.

FIG. 14 is a structural diagram of another display panel according to an embodiment of the present disclosure. Referring to FIG. 14, optionally, the distance between two first scan signal lines S1 in two adjacent second pixel units 201 in the second direction Y is D3 at a preset position in the first direction X, and the distance between two first scan signal lines S1 in two adjacent first pixel units 101 in the second direction Y is D4 at the preset position in the first direction X, where the preset position is any position in the first direction X, and D3<D4.

Since the first scan signal line S1 in the pixel unit is not a completely straight line structure, the edge of the first scan signal line S1 may have a certain curve or polyline design. On this basis, the distance between the two adjacent first scan signal lines S1 may change with the change of the edge line, that is, the distance is not a fixed value. In this embodiment, for any preset position in the first direction X, the distance between the two first scan signal lines S1 in the second pixel units 101 in two adjacent rows is always less than the distance between the two first scan signal lines S1 in the first pixel units 101 in two adjacent rows. Essentially, the distance between the two first scan signal lines S1 in the second pixel units 201 in two adjacent rows is reduced so that in addition to reducing the length of the second pixel unit 201 in the column direction by disposing only the first scan signal line S1 in the second pixel unit 201, the distance between two rows of the second pixel units 201 in the column direction is further reduced, which is more conducive to reducing the area of the load compensation units and achieving a narrow bezel design.

Figure 15:
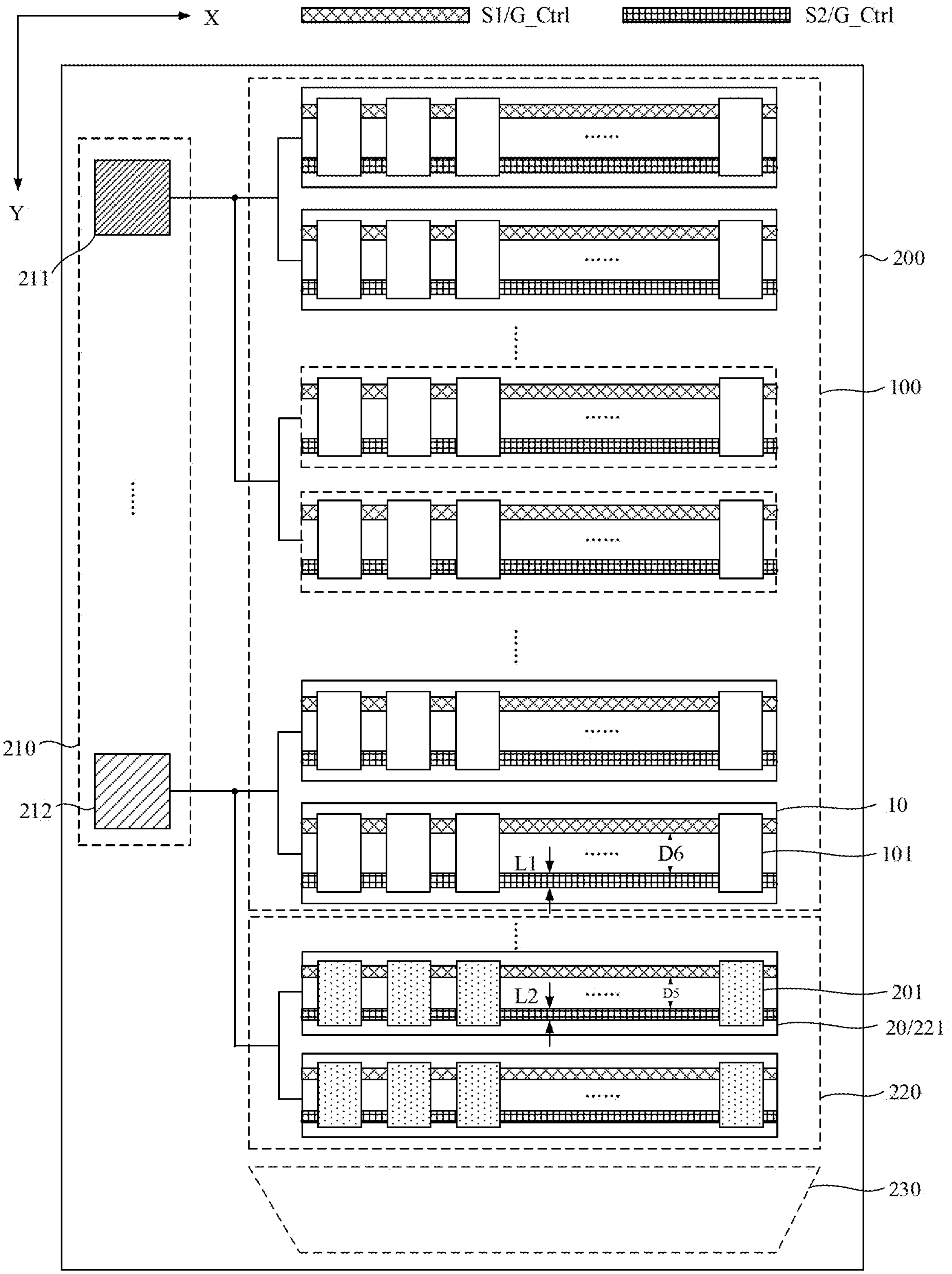
FIG. 15 is a structural diagram of another display panel according to an embodiment of the present disclosure.

In addition to the preceding embodiment in which only the first scan signal line is provided in the second pixel unit, in the present disclosure, optionally, the first scan signal line and the second scan signal line may be provided in the second pixel unit at the same time. FIG. 15 is a structural diagram of another display panel according to an embodiment of the present disclosure. Referring to FIG. 15, in another embodiment of the present disclosure, optionally, the first pixel unit 101 and the second pixel unit 201 each include the first scan signal line S1 and the second scan signal line S2, where both the first scan signal line S1 and the second scan signal line S2 extend along the first direction X. Moreover, the distance D5 between the first scan signal line S1 and the second scan signal line S2 in the second pixel unit 201 is less than the distance D6 between the first scan signal line S1 and the second scan signal line S2 in the first pixel unit 101, and/or the linewidth of the first scan signal line S1 in the second pixel unit 201 is less than the linewidth of the first scan signal line S1 in the first pixel unit 101, and the linewidth L2 of the second scan signal line S2 in the second pixel unit 201 is less than the linewidth L1 of the second scan signal line S2 in the first pixel unit 101.

Therefore, compared with the first pixel unit 101, the linewidth of and/or distance between the two types of scan signal lines in the second pixel unit 201 are configured to be relatively small, with the same purpose of compressing the second pixel unit 201 in the second direction Y, that is, the column direction, so as to reduce the area of the load compensation units as much as possible, thereby achieving a narrow bezel design.

It is to be added that since the first scan signal line S1 and the second scan signal line S2 in the second pixel unit 201 have a special design of the linewidth and the line distance, this special design may affect the load of the second pixel unit 201, causing that the load of the second pixel unit 201 is different from the load of the first pixel unit 101. Therefore, in this embodiment, optionally, the lateral capacitance of the first scan signal line S1 and the second scan signal line S2 in the second pixel unit 201 is equal to the lateral capacitance of the first scan signal line S1 and the second scan signal line S2 in the first pixel unit 101. At this time, even if the line width and line distance of the first scan signal line S1 and the second scan signal line S2 in the second pixel unit 201 change, other manners may be adopted. For example, the first scan signal line S1 and the second scan signal line S2 are made of different conductive materials, or dielectric material is added, so as to adjust the lateral capacitance of the two scan signal lines and avoid excessive load changes.

In addition, the preceding various embodiments are essentially simplifications based on the existing pixel circuit. In addition to improvements based on the existing pixel circuit, the embodiment of the present disclosure further provides other forms of load compensation units.

Figure 16:
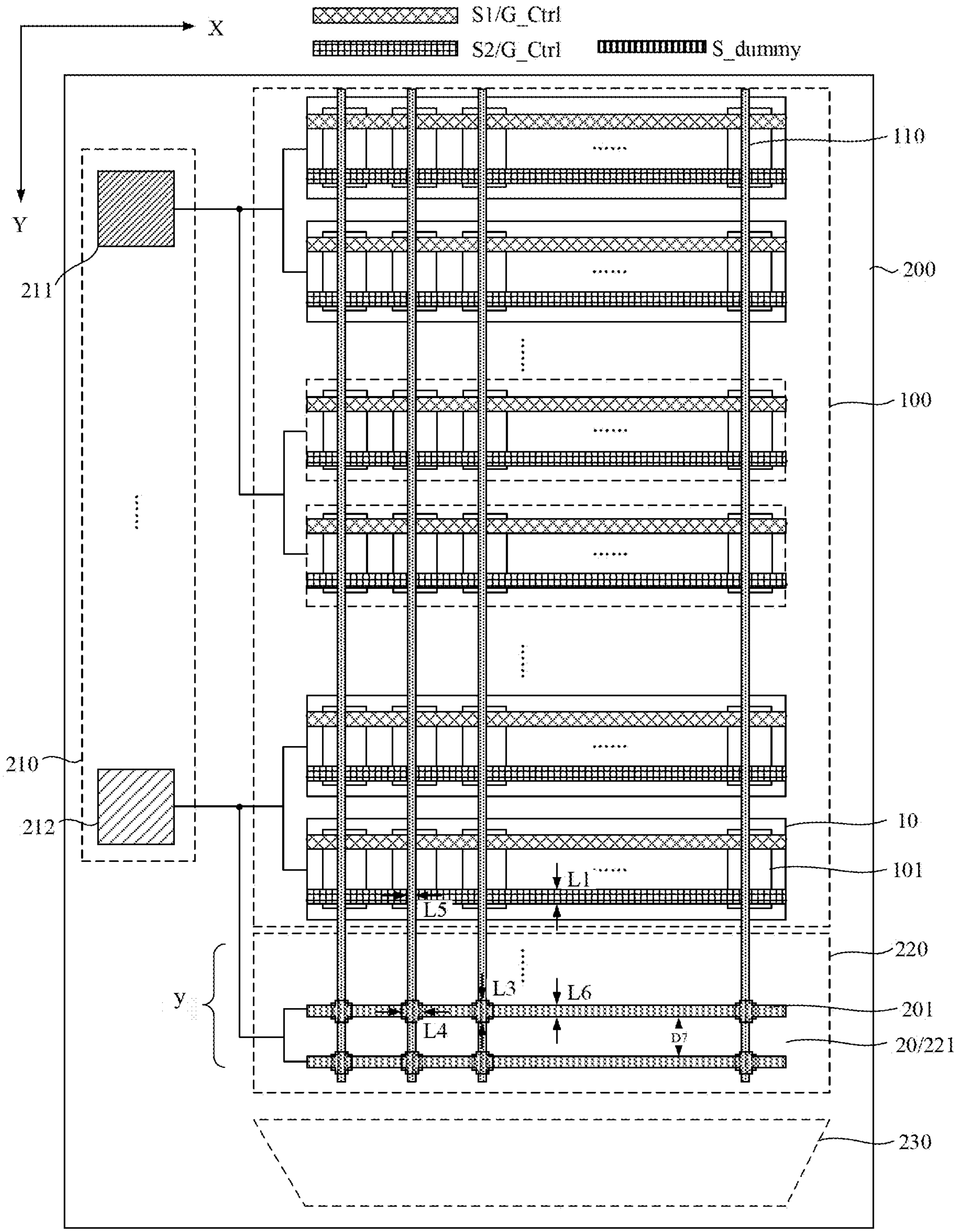
FIG. 16 is a structural diagram of another display panel according to an embodiment of the present disclosure.

FIG. 16 is a structural diagram of another display panel according to an embodiment of the present disclosure. Referring to FIG. 16, the load compensation unit includes a redundant signal line S_dummy extending along the first direction X, and the second shift register unit 212 is electrically connected to y redundant signal lines S_dummy, where y is a positive integer, and m=n+y.

In this embodiment, the signal line is essentially used as a load compensation structure to perform load compensation on the second shift register unit 212. The number of the redundant signal lines S_dummy connected to the second shift register unit 212 is equal to the number by which the number of the display pixel groups 10, that is, the pixel rows, connected to the first shift register unit 211 is greater than the number of the display pixel groups 10, that is, the pixel rows, connected to the second shift register unit 212. The pixel rows are replaced with the redundant signal lines S_dummy so that the number of the pixel rows connected to the second shift register unit 212 is the same as the number of the pixel rows connected to the first shift register unit 211, both of which are m, thereby ensuring that the second shift register unit 212 and the first shift register unit 211 have the consistent loads and the brightness of the correspondingly driven pixel rows in the display region 100 is the same.

Further, the display region 100 includes multiple first signal lines 110 extending along the second direction Y to the compensation region 220; and the redundant signal line S_dummy and the first signal lines 110 overlap and are insulated from each other. Considering that the load of the pixel unit connected to the shift register unit is mainly reflected in the capacitance inside the pixel unit, when the pixel rows are replaced with the redundant signal lines S_dummy, optionally, the sum of overlap capacitances of the redundant signal line S_dummy and the multiple first signal lines 110 is equal to the capacitance of the display pixel group 10.

Here, the first signal line 110 may be a power signal line and a reference signal line. The signals transmitted on the first signal line are all fixed-potential signals and are less affected by the overlap capacitance of the redundant signal line S_dummy. Optionally, the distance D7 between two adjacent redundant signal lines S_dummy is greater than or equal to 10 μm. In this case, not only can the problem of difficulty in preparing the redundant signal lines caused by insufficient etching precision be avoided so that the preparation of two redundant signal lines S_dummy is facilitated, but also it can be ensured that a relatively small lateral capacitance exists between the redundant signal lines S_dummy, thereby avoiding additional loads between the redundant signal lines.

Further, the first pixel unit 101 includes the first scan signal line S1 and the second scan signal line S2, where both the first scan signal line S1 and the second scan signal line S2 extend along the first direction X; the display region 100 includes multiple first signal lines 110 extending along the second direction Y to the compensation region 220, where the redundant signal line S_dummy and the first signal lines 110 overlap and are insulated from each other. Based on this, the linewidth L3 of the redundant signal line S_dummy in a region where the redundant signal line S_dummy overlaps the first signal line 110 is greater than at least one of the linewidth of the first scan signal line S1 and the linewidth L1 of the second scan signal line S2, and/or the linewidth L4 of the first signal line 110 in the region where the first signal line 110 overlaps the redundant signal line S_dummy is greater than the linewidth L5 of the first signal line 110 in the display region 100.

In this embodiment, the redundant signal line S_dummy is essentially used to overlap the signal lines extending longitudinally to the compensation region 220 to form capacitors, which are used as loads to compensate the second shift register unit 212. The linewidths of the redundant signal line S_dummy and the first signal line 110 in the region where the redundant signal line S_dummy and the first signal line 110 overlap are increased so that the overlapping area, that is, the magnitude of the overlap capacitance, is essentially increased, thereby ensuring that the redundant signal line S_dummy forms sufficient overlap capacitance to compensate the second shift register unit 212.

Based on the preceding method of adjusting the load by improving the linewidth in the overlapping region, in other embodiments of the present disclosure, it is also feasible that the linewidth L6 of the redundant signal line S_dummy in a region where the redundant signal line S_dummy does not overlap the first signal line 110 is less than at least one of the linewidth of the first scan signal line S1 and the linewidth L1 of the second scan signal line S2. In this case, for the entire redundant signal line S_dummy, the linewidth of the partial region, that is, the overlapping region, is increased, easily causing the overall resistance of the redundant signal line S_dummy to change, and correspondingly, the linewidth of the non-overlapping region is appropriately reduced, that is, the overall resistance is compensated, thereby ensuring that the resistive loads of the display pixel groups connected to the first shift register unit 211 are consistent.

Figure 17:
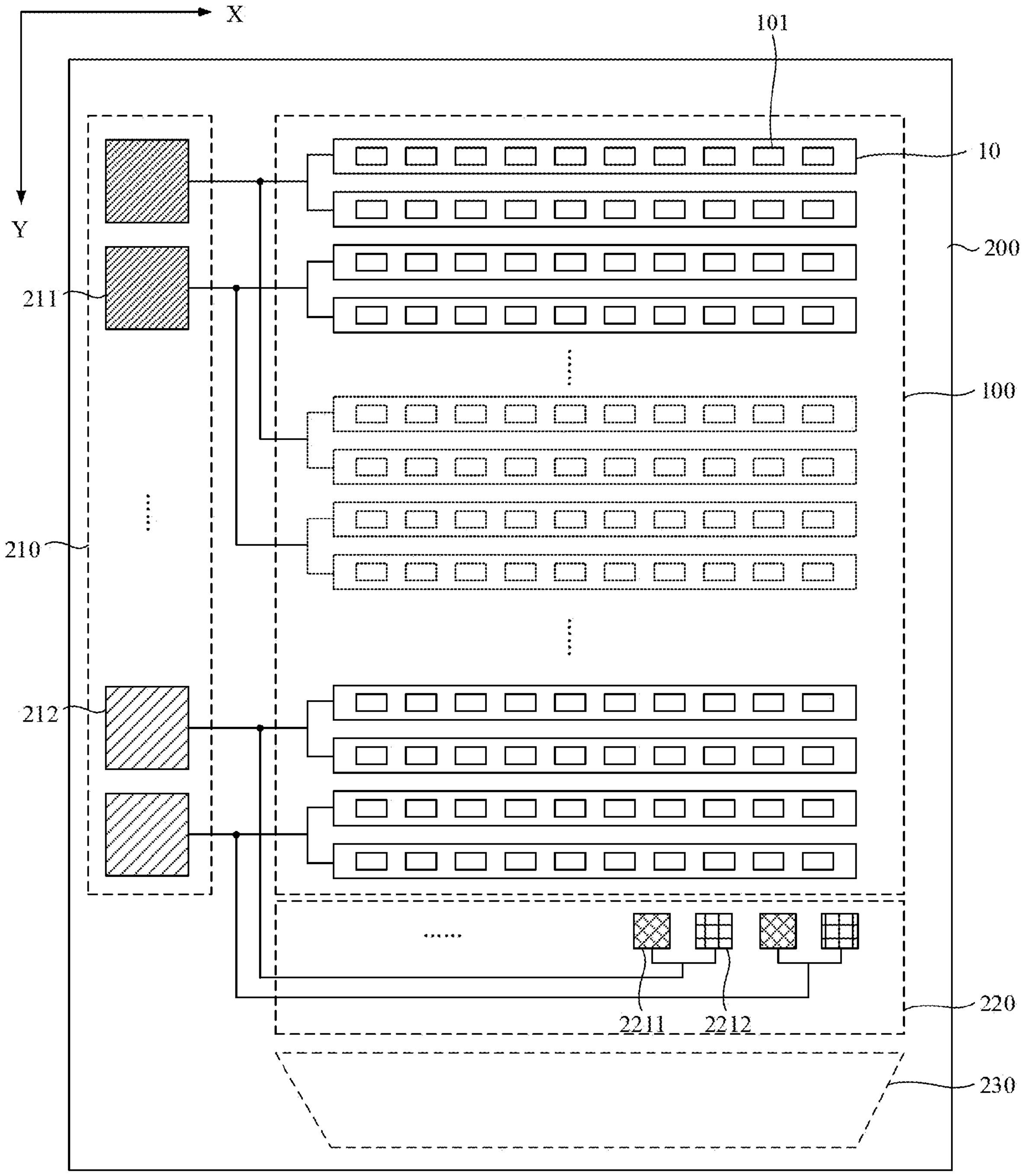
FIG. 17 is a structural diagram of another display panel according to an embodiment of the present disclosure.

FIG. 17 is a structural diagram of another display panel according to an embodiment of the present disclosure. Referring to FIG. 17, in other embodiments of the present disclosure, optionally, the load compensation units 221 include compensation capacitors 2211, where the second shift register unit 212 is electrically connected to at least one of the compensation capacitors 2211; and/or the load compensation units 221 include compensation resistors 2212, where the second shift register unit 212 is electrically connected to at least one of the compensation resistors 2211.

In this embodiment, the compensation capacitors 2211 and the compensation resistors 2212 are actually separate and specially designed capacitors and resistors in the bezel region 200 of the display panel. Certain values of capacitance and resistance are achieved through material selection, dielectric, and other manners, so as to match the values of capacitance and resistance in the loads that are in the first shift register unit 211 and not in the second shift register unit 212, thereby performing direct load compensation using the compensation capacitors 2211 and the compensation resistors 2212. It is to be understood that those skilled in the art can obtain the load difference between the first shift register unit 211 and the second shift register unit 212 through simulation, thereby obtaining the specific values of the compensation capacitors 2211 and the compensation resistors 2212. Then, the compensation capacitors 2211 and the compensation resistors 2212 are prepared and formed at appropriate positions in the bezel region of the panel.

It is to be added that the compensation capacitors and the compensation resistors are set such that the total value matches the load compensation requirement. The number of the compensation capacitors 2211 and the number of the compensation resistors 2212 are not limited here. The compensation capacitors 2211 and the compensation resistors 2212 may be connected in series or parallel, which is not limited here. Moreover, as shown in FIG. 17, the case where the compensation capacitors 2211 and the compensation resistors 2212 are disposed between the fan-out region 230 and the display region 100 is merely an example. Those skilled in the art can also set the compensation capacitors 2211 and the compensation resistors 2212 at other positions in the bezel region not affecting the wires and wiring, which is not limited here.

Figure 18:
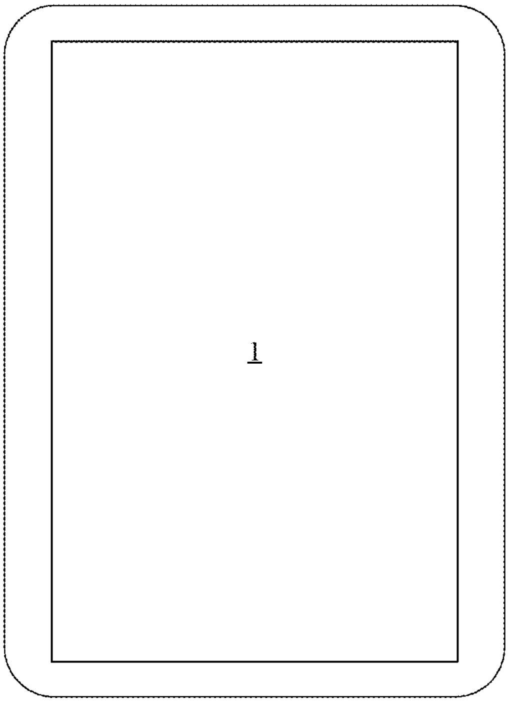
FIG. 18 is a structural diagram of a display device according to an embodiment of the present disclosure.

Based on the same inventive concept, the embodiment of the present disclosure further provides a display device. FIG. 18 is a structural diagram of a display device according to an embodiment of the present disclosure. Referring to FIG. 18, the display device may include any display panel 1 according to the preceding embodiments. Moreover, since the display device is made of the preceding display panel, the display device has the same or corresponding technical effects as the preceding display panel. It is to be noted that the display device further includes other devices for supporting the normal operation of the display device. Specifically, the display device may be a mobile phone, a tablet, a computer, a television, a smart wearable device, or the like, which is not limited in the embodiment of the present disclosure.

It is to be noted that the preceding are only preferred embodiments of the present disclosure and the technical principles used therein. It is to be understood by those skilled in the art that the present disclosure is not limited to the embodiments described herein. Those skilled in the art can make various apparent modifications, adaptations, combinations, and substitutions without departing from the scope of the present disclosure. Therefore, while the present disclosure has been described in detail through the preceding embodiments, the present disclosure is not limited to the preceding embodiments and may include other equivalent embodiments without departing from the concept of the present disclosure. The scope of the present disclosure is determined by the scope of the appended claims.

What is claimed is:

1. A display panel, comprising: a display region and a bezel region surrounding the display region, wherein the bezel region comprises a shift register region and a compensation region, and the shift register region is located on at least one side of the display region in a first direction;

wherein the display region comprises a plurality of display pixel groups, a display pixel group of the plurality of display pixel groups comprises a plurality of first pixel units arranged in sequence along the first direction, and the plurality of display pixel groups are arranged in sequence along a second direction, wherein the first direction intersects with the second direction;

the shift register region comprises first shift register units and second shift register units, wherein a first shift register unit of the first shift register units is electrically connected to m display pixel groups of the plurality of display pixel groups, and a second shift register unit of the second shift register units is electrically connected to n display pixel groups of the plurality of display pixel groups, wherein m and n are positive integers, and m>n; and the compensation region comprises load compensation units electrically connected to the second shift register units.

2. The display panel of claim 1, wherein the bezel region further comprises a fan-out region, wherein the compensation region is located between the fan-out region and the display region; or the compensation region is located on a side of the display region facing away from the fan-out region.

3. The display panel of claim 1, comprising a plurality of gate control signal lines extending along the first direction, wherein the plurality of gate control signal lines comprise first scan signal lines and second scan signal lines;

the first shift register unit is connected to R adjacent display pixel groups of the plurality of display pixel groups through R first scan signal lines and is connected to the other R adjacent display pixel groups of the plurality of display pixel groups through R second scan signal lines, wherein R=m/2; and the second shift register unit is connected to n adjacent display pixel groups through n second scan signal lines;

wherein display pixel groups connected to the first shift register unit and display pixel groups connected to the second shift register unit are different.

4. The display panel of claim 3, wherein display pixel groups electrically connected to the first shift register unit through the R second scan signal lines are grouped into a first display pixel group, display pixel groups electrically connected to the first shift register unit through the R first scan signal lines are grouped into a second display pixel group, and the first display pixel group and the second display pixel group are spaced by S display pixel groups of the plurality of display pixel groups;

wherein R and S are both positive integers, and S is an integer multiple of R; and wherein the compensation region comprises T load compensation units, wherein every R adjacent ones of the T load compensation units are electrically connected to one of the second shift register units, and T=R+S.

5. The display panel of claim 1, wherein the load compensation units comprises compensation pixel groups, a compensation pixel group of the compensation pixel groups comprises a plurality of second pixel units arranged in sequence along the first direction, and the second shift register unit is electrically connected to x compensation pixel groups of the compensation pixel groups, wherein x is a positive integer, and m=n+x.

6. The display panel of claim 5, wherein a length of a second pixel unit of the plurality of second pixel units in the second direction is less than a length of a first pixel unit of the plurality of first pixel units in the second direction.

7. The display panel of claim 5, wherein a first pixel unit of the plurality of first pixel units and a second pixel unit of the plurality of second pixel units each comprises a data signal line extending along the second direction and gate control signal lines extending along the first direction, wherein the gate control signal lines intersect with the data signal line; and wherein a number of the gate control signal lines in the second pixel unit is less than a number of the gate control signal lines in the first pixel unit.

8. The display panel of claim 7, wherein the gate control signal lines comprise a first scan signal line, a second scan signal line, a third scan signal line, and a light emission control signal line; and the first pixel unit comprises the first scan signal line, the second scan signal line, the third scan signal line, and the light emission control signal line, and the second pixel unit comprises the first scan signal line.

9. The display panel of claim 8, wherein the first pixel unit and the second pixel unit each comprises at least one first reference signal line;

wherein the at least one first reference signal line extends along the first direction and is located on a side of the first scan signal line in the second direction.

10. The display panel of claim 9, wherein a distance between the first reference signal line and the first scan signal line in the first pixel unit is equal to a distance between the first reference signal line and the first scan signal line in the second pixel unit.

11. The display panel of claim 9, wherein a number of transistors in the second pixel unit is less than a number of transistors in the first pixel unit.

12. The display panel of claim 11, wherein the transistors in the first pixel unit comprise:

a drive transistor;

a first transistor, wherein a control terminal of the first transistor is electrically connected to the third scan signal line, a first electrode of the first transistor is electrically connected to a first electrode of the drive transistor, and a second electrode of the first transistor is electrically connected to the data signal line;

a second transistor, wherein a control terminal of the second transistor is electrically connected to the second scan signal line, a first electrode of the second transistor is electrically connected to a gate of the drive transistor, and a second electrode of the second transistor is electrically connected to a second electrode of the drive transistor;

a third transistor, wherein a control terminal of the third transistor is electrically connected to the first scan signal line in the first pixel unit, a first electrode of the third transistor is electrically connected to the gate of the drive transistor, and a second electrode of the third transistor is electrically connected to the first reference signal line in the first pixel unit;

a fourth transistor, wherein a control terminal of the fourth transistor is electrically connected to the third scan signal line, a first electrode of the fourth transistor is electrically connected to a first electrode of a light-emitting element, and a second electrode of the fourth transistor is electrically connected to the first reference signal line in the first pixel unit;

a fifth transistor, wherein a control terminal of the fifth transistor is electrically connected to the light emission control signal line, a first electrode of the fifth transistor is electrically connected to the first electrode of the drive transistor, and a second electrode of the fifth transistor is electrically connected to a first power signal line; and a sixth transistor, wherein a control terminal of the sixth transistor is electrically connected to the light emission control signal line, a first electrode of the sixth transistor is electrically connected to the second electrode of the drive transistor, and a second electrode of the sixth transistor is electrically connected to the first electrode of the light-emitting element;

wherein the transistors in the second pixel unit comprise:

a seventh transistor, wherein a control terminal of the seventh transistor is electrically connected to the first scan signal line in the second pixel unit, a first electrode of the seventh transistor is floating, and a second electrode of the seventh transistor is electrically connected to the first reference signal line in the second pixel unit.

13. The display panel of claim 1, wherein the load compensation units comprise redundant signal lines extending along the first direction, and the second shift register unit is electrically connected to y redundant signal lines of the redundant signal lines, wherein y is a positive integer, and m=n+y.

14. The display panel of claim 13, wherein the display region comprises a plurality of first signal lines extending along the second direction to the compensation region;

wherein a redundant signal line of the redundant signal lines and the plurality of first signal lines overlap and are insulated from each other, and a sum of overlap capacitances of the redundant signal line and the plurality of first signal lines is equal to a capacitance of the display pixel group of the plurality of display pixel groups.

15. The display panel of claim 13, wherein a first pixel unit of the plurality of first pixel units comprises a first scan signal line and a second scan signal line, wherein both the first scan signal line and the second scan signal line extend along the first direction;

wherein the display region comprises a plurality of first signal lines extending along the second direction to the compensation region, wherein a redundant signal line of the redundant signal lines and the plurality of first signal lines overlap and are insulated from each other, and a overlapped region where the redundant signal line overlaps one of the plurality of first signal lines satisfies at least one of:

a linewidth of the redundant signal line in the overlapped region is greater than at least one of a linewidth of the first scan signal line and a linewidth of the second scan signal line, or a linewidth of one of the plurality of first signal lines in the overlapped region is greater than a linewidth of the one of the plurality of first signal lines in the display region.

16. The display panel of claim 15, wherein the plurality of first signal lines comprise a power signal line and a reference signal line.

17. The display panel of claim 15, wherein a distance between two adjacent redundant signal lines is greater than or equal to 10 μm.

18. The display panel of claim 15, wherein a linewidth of the redundant signal line in a region where the redundant signal line does not overlap the plurality of first signal lines is less than at least one of the linewidth of the first scan signal line and the linewidth of the second scan signal line.

19. The display panel of claim 1, wherein the load compensation units comprise at least one of the following:

compensation capacitors, wherein the second shift register unit is electrically connected to at least one of the compensation capacitors; or compensation resistors, wherein the second shift register unit is electrically connected to at least one of the compensation resistors.

20. A display device, comprising a display panel, wherein the display panel comprises:

a display region and a bezel region surrounding the display region, wherein the bezel region comprises a shift register region and a compensation region, and the shift register region is located on at least one side of the display region in a first direction;

wherein the display region comprises a plurality of display pixel groups, a display pixel group of the plurality of display pixel groups comprises a plurality of first pixel units arranged in sequence along the first direction, and the plurality of display pixel groups are arranged in sequence along a second direction, wherein the first direction intersects with the second direction;

the shift register region comprises first shift register units and second shift register units, wherein a first shift register unit of the first shift register units is electrically connected to m display pixel groups of the plurality of display pixel groups, and a second shift register unit of the second shift register units is electrically connected to n display pixel groups of the plurality of display pixel groups, wherein m and n are positive integers, and m>n; and the compensation region comprises load compensation units electrically connected to the second shift register units.

* * * * *